United States Patent
Kondo et al.

(10) Patent No.: US 9,575,290 B2
(45) Date of Patent: *Feb. 21, 2017

(54) IMAGING LENS AND IMAGING APPARATUS EQUIPPED WITH THE IMAGING LENS

(71) Applicant: FUJIFILM Corporation, Tokyo (JP)

(72) Inventors: Masato Kondo, Saitama-ken (JP); Takayuki Noda, Saitama-ken (JP); Tatsuyuki Ogino, Saitama-ken (JP); Michio Cho, Saitama-ken (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/856,585

(22) Filed: Sep. 17, 2015

(65) Prior Publication Data

US 2016/0004045 A1 Jan. 7, 2016

Related U.S. Application Data

(63) Continuation of application No. PCT/JP2013/007603, filed on Dec. 26, 2013.

(30) Foreign Application Priority Data

Mar. 26, 2013 (JP) ................. 2013-063293

(51) Int. Cl.
*G02B 13/18* (2006.01)
*G02B 9/60* (2006.01)
(Continued)

(52) U.S. Cl.
CPC .......... *G02B 13/0045* (2013.01); *G02B 5/005* (2013.01); *G02B 27/0025* (2013.01); *G02B 9/60* (2013.01); *G02B 13/002* (2013.01); *G02B 13/18* (2013.01)

(58) Field of Classification Search
CPC ... G02B 13/0045; G02B 9/60; G02B 27/0025; G02B 13/18; G02B 5/005; G02B 13/002
(Continued)

(56) References Cited

U.S. PATENT DOCUMENTS 9,261,671 B2 * 2/2016 Noda ................. G02B 13/0045
2011/0249348 A1 * 10/2011 Kubota .............. G02B 13/0045
359/764

(Continued)

FOREIGN PATENT DOCUMENTS

CN 202583582 12/2012
JP 2010256608 11/2010
(Continued)

OTHER PUBLICATIONS

"International Search Opinion (PCT/IPEA/409)" of PCT/JP2013/007603, with partial English translation thereof, pp. 1-4, in which one of the listed references (JP2013054099) was cited.

*Primary Examiner* — Evelyn A Lester
(74) *Attorney, Agent, or Firm* — Jianq Chyun IP Office

(57) ABSTRACT

An imaging lens is constituted of five lenses, including, in order from the object side to the image side: a first lens having a positive refractive power, which is of a meniscus shape having a convex surface toward the object side; a second lens having a negative refractive power and a concave surface toward the image side; a third lens having a positive refractive power, which is of a meniscus shape having a convex surface toward the object side; a fourth lens having a negative refractive power; and a fifth lens having a negative refractive power and at least one inflection point on the surface thereof toward the image side. Predetermined conditional formulae are satisfied.

16 Claims, 14 Drawing Sheets

(51) Int. Cl.
*G02B 13/00* (2006.01)
*G02B 5/00* (2006.01)
*G02B 27/00* (2006.01)

(58) Field of Classification Search
USPC .................. 359/714, 739, 740, 763, 764
See application file for complete search history.

(56) References Cited

U.S. PATENT DOCUMENTS

| | | |
|---|---|---|
| 2013/0057973 A1 | 3/2013 | Kubota et al. |
| 2013/0182336 A1 | 7/2013 | Hsu et al. |
| 2013/0329307 A1 | 12/2013 | Jung et al. |
| 2014/0192423 A1* | 7/2014 | Kondo ............... G02B 13/18 359/714 |
| 2014/0293453 A1* | 10/2014 | Ogino ............ G02B 13/0045 359/714 |
| 2015/0077864 A1* | 3/2015 | Noda ................. G02B 13/18 359/714 |
| 2015/0286036 A1* | 10/2015 | Kondo ............. G02B 13/0045 359/714 |
| 2016/0195701 A1* | 7/2016 | Chen .................... G02B 9/60 359/714 |

FOREIGN PATENT DOCUMENTS

| | | |
|---|---|---|
| JP | 2013054099 | 3/2013 |
| JP | 2013106289 | 5/2013 |
| JP | 2013257527 | 12/2013 |

\* cited by examiner

EXAMPLE 1

FIG.5  EXAMPLE 5

FIG.7  EXAMPLE 1

IMAGING LENS AND IMAGING APPARATUS EQUIPPED WITH THE IMAGING LENS

CROSS REFERENCE TO RELATED APPLICATIONS

The present application is a Continuation of PCT International Application No. PCT/JP2013/007603 filed on Dec. 26, 2013, which claims priority under 35 U.S.C. §119(a) to Japanese Patent Application No. 2013-063293 filed on Mar. 26, 2013. Each of the above applications is hereby expressly incorporated by reference, in its entirety, into the present application.

BACKGROUND

The present disclosure is related to a fixed focus imaging lens for forming optical images of subjects onto an imaging element such as a CCD (Charge Coupled Device) and a CMOS (Complementary Metal Oxide Semiconductor). The present disclosure is also related to an imaging apparatus provided with the imaging lens that performs photography such as a digital still camera, a cellular telephone with a built in camera, a PDA (Personal Digital Assistant), a smart phone, a tablet type terminal, and a portable gaming device.

Accompanying the recent spread of personal computers in households, digital still cameras capable of inputting image data such as photographed scenes and portraits into personal computers are rapidly becoming available. In addition, many cellular telephones, smart phones, and tablet type terminals are being equipped with camera modules for inputting images. Imaging elements such as CCD's and CMOS's are employed in these devices having photography functions. Recently, miniaturization of these imaging elements is advancing, and there is demand for miniaturization of the entirety of the photography devices as well as imaging lenses to be mounted thereon. At the same time, the number of pixels in imaging elements is increasing, and there is demand for high resolution and high performance of imaging lenses. Performance corresponding to 5 megapixels or greater, and more preferably 8 megapixels or greater, is desired.

In response to such demands, imaging lenses having a five lens configuration or a six lens configuration, which are comparatively large numbers of lenses have been proposed, in order to improve performance may be considered. For example, Chinese Utility Model No. 202583582 and Japanese Unexamined Patent Publication No. 2010-256608 disclose imaging lenses having five lens configurations, constituted by a first lens having a positive refractive power, a second lens having a negative refractive power, a third lens having a positive refractive power, a fourth lens having a negative refractive power, and a fifth lens having a negative refractive power.

SUMMARY

Meanwhile, demand for further shortening of the total lengths of lenses is increasing for imaging lenses which are employed in devices such as smart phones and tablet terminals, which are becoming progressively thinner. For this reason, there is demand for the total lengths of the imaging lenses disclosed in Chinese Utility Model No. 202583582 and Japanese Unexamined Patent Publication No. 2010-256608 to become even shorter.

The present disclosure has been developed in view of the foregoing points. The present disclosure provides an imaging lens that can realize a shortening of the total length, and can realize high imaging performance from a central angle of view to peripheral angles of view. The present disclosure also provides an imaging apparatus equipped with the lens, which is capable of obtaining high resolution photographed images.

A first imaging lens of the present disclosure consists of five lenses, including, in order from the object side to the image side:

a first lens having a positive refractive power, which is of a meniscus shape having a convex surface toward the object side;

a second lens having a negative refractive power and a concave surface toward the image side;

a third lens having a positive refractive power, which is of a meniscus shape having a convex surface toward the object side;

a fourth lens having a negative refractive power; and a fifth lens having a negative refractive power and at least one inflection point on the surface thereof toward the image side;

in which Conditional Formula (1) below is satisfied.

$$-3 < f1/f23 < -0.389 \quad (1)$$

wherein f1 is the focal length of the first lens, and f23 is the combined focal length of the second lens and the third lens.

A second imaging lens of the present disclosure consists of five lenses, including, in order from the object side to the image side:

a first lens having a positive refractive power, which is of a meniscus shape having a convex surface toward the object side;

a second lens of a biconcave shape;

a third lens having a positive refractive power, which is of a meniscus shape having a convex surface toward the object side;

a fourth lens having a negative refractive power; and a fifth lens having a negative refractive power and at least one inflection point on the surface thereof toward the image side;

in which Conditional Formula (6) below is satisfied.

$$-0.46 < f/f45 < 0 \quad (6)$$

wherein f is the focal length of the entire lens system, and f45 is the combined focal length of the fourth lens and the fifth lens.

According to the first and second imaging lenses of the present disclosure, the configuration of each lens element from the first lens through the fifth lens is optimized within a lens configuration having five lenses as a whole. Therefore, a lens system that can achieve a short total length and has high imaging performance can be realized.

Note that in the first and second imaging lenses of the present disclosure, the expression "consists of five lenses" means that the imaging lens of the present disclosure may also include lenses that practically have no power, optical elements other than lenses such as a stop and a cover glass, and mechanical components such as lens flanges, a lens barrel, a camera shake correcting mechanism, etc., in addition to the five lenses. In addition, the shapes of the surfaces of the lenses and the signs of the refractive indices thereof are considered in the paraxial region in the case that the lenses include aspherical surfaces.

The optical performance of the first and second imaging lenses of the present disclosure can be further improved by adopting the following favorable configurations.

In the first imaging lens of the present disclosure, it is preferable for the second lens to be of a biconvex shape.

It is preferable for the first imaging lens of the present disclosure to further comprise an aperture stop positioned at the object side of the surface of the second lens toward the object side.

In the first and second imaging lenses of the present disclosure, it is preferable for one of Conditional Formulae (1-1) through (8) to be satisfied. Note that as a preferable aspect, one or arbitrary combinations of Conditional Formulae (1) through (8) below may be satisfied.

$$-2<f1/f23<-0.4 \quad (1\text{-}1)$$

$$-3<f/f2<-0.75 \quad (2)$$

$$-2<f/f2<-0.8 \quad (2\text{-}1)$$

$$-0.18<(R3f-R3r)/(R3f+R3r)<0.5 \quad (3)$$

$$-0.15<(R3f-R3r)/(R3f+R3r)<0.2 \quad (3\text{-}1)$$

$$-0.45<\text{Pair67}<-0.1 \quad (4)$$

$$-0.4<\text{Pair67}<-0.2 \quad (4\text{-}1)$$

$$0.5<f \tan \omega/R5r<10 \quad (5)$$

$$0.7<f \tan \omega/R5r<3 \quad (5\text{-}1)$$

$$-0.46<f/f45<0 \quad (6)$$

$$1.6<Nd3 \quad (7)$$

$$vd3<30 \quad (8)$$

wherein f is the focal length of the entire system, f1 is the focal length of the first lens, f2 is the focal length of the second lens, f5 is the focal length of the fifth lens, f23 is the combined focal length of the second lens and the third lens, f45 is the combined focal length of the fourth lens and the fifth lens, R3f is the paraxial radius of curvature of the surface of the third lens toward the object side, R3r is the paraxial radius of curvature of the surface of the third lens toward the image side, Pair67 is the refractive power of an air lens formed between the third lens and the fourth lens (1/focal length), R5r is the paraxial radius of curvature of the surface of the fifth lens toward the image side, ω is the half angle of view, Nd3 is the refractive index of the material of the third lens with respect to the d line, and vd3 is the Abbe's number of the material of the third lens with respect to the d line.

An imaging apparatus of the present disclosure is equipped with an imaging lens of the present disclosure.

According to the imaging apparatus of the present disclosure, high resolution image signals can be obtained based on high resolution optical images obtained by the imaging lens of the present disclosure.

According to the first and second imaging lenses of the present disclosure, the configuration of each lens element is optimized within a lens configuration having five lenses as a whole. Therefore, a lens system that can achieve a short total length and has high imaging performance from a central angle of view to peripheral angles of view can be realized.

The imaging apparatus of the present disclosure outputs image signals corresponding to optical images formed by an imaging lens of the present disclosure, which has high imaging performance. Therefore, the imaging apparatus of the present disclosure is capable of obtaining high resolution photographed images.

DESCRIPTION OF THE PREFERRED EMBODIMENTS

Hereinafter, embodiments of the present disclosure will be described in detail with reference to the attached drawings.

Figure 1:
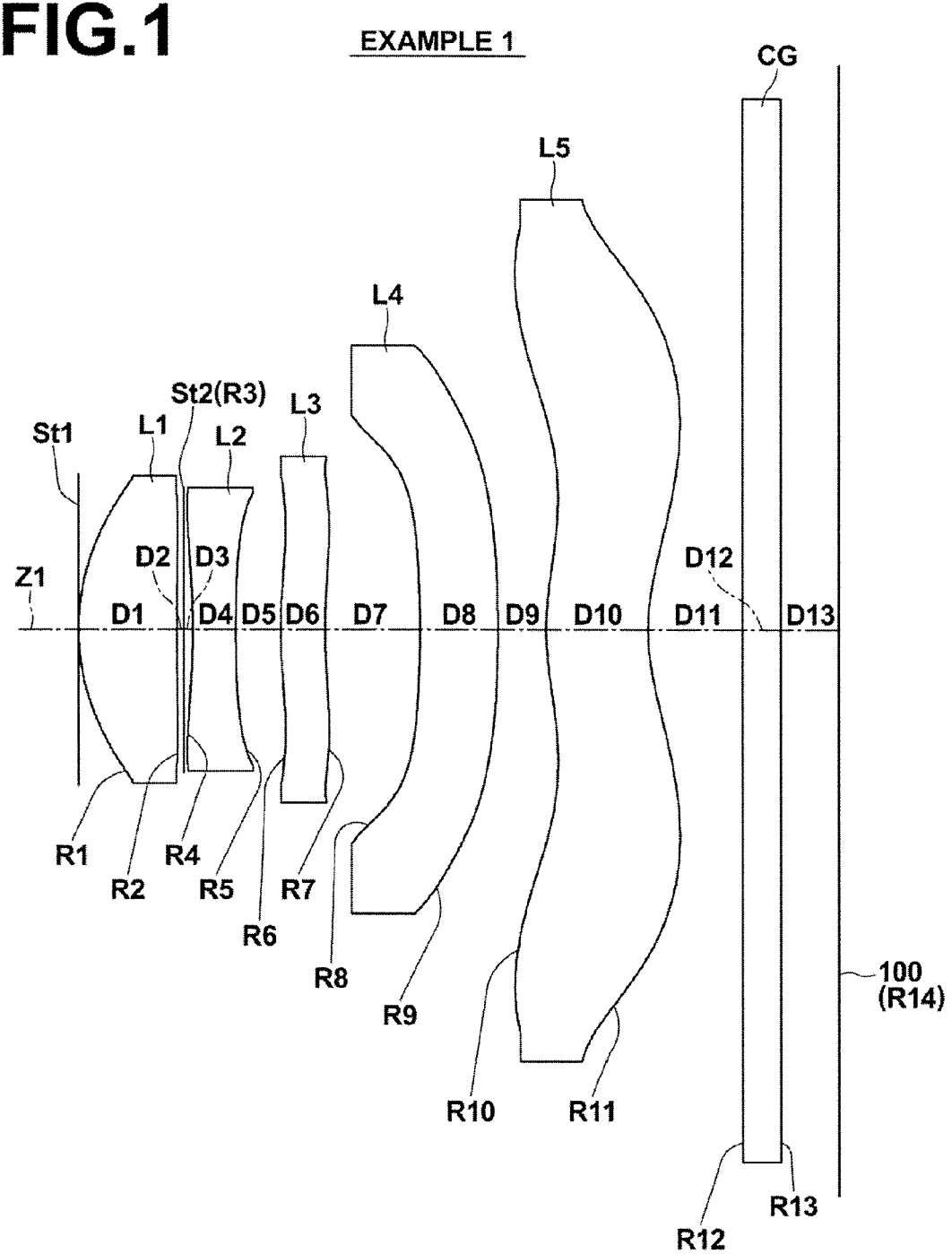
FIG. 1 is a sectional diagram that illustrates a first example of the configuration of an imaging lens according to an embodiment of the present disclosure, and corresponds to a lens of Example 1.
Figure 7:
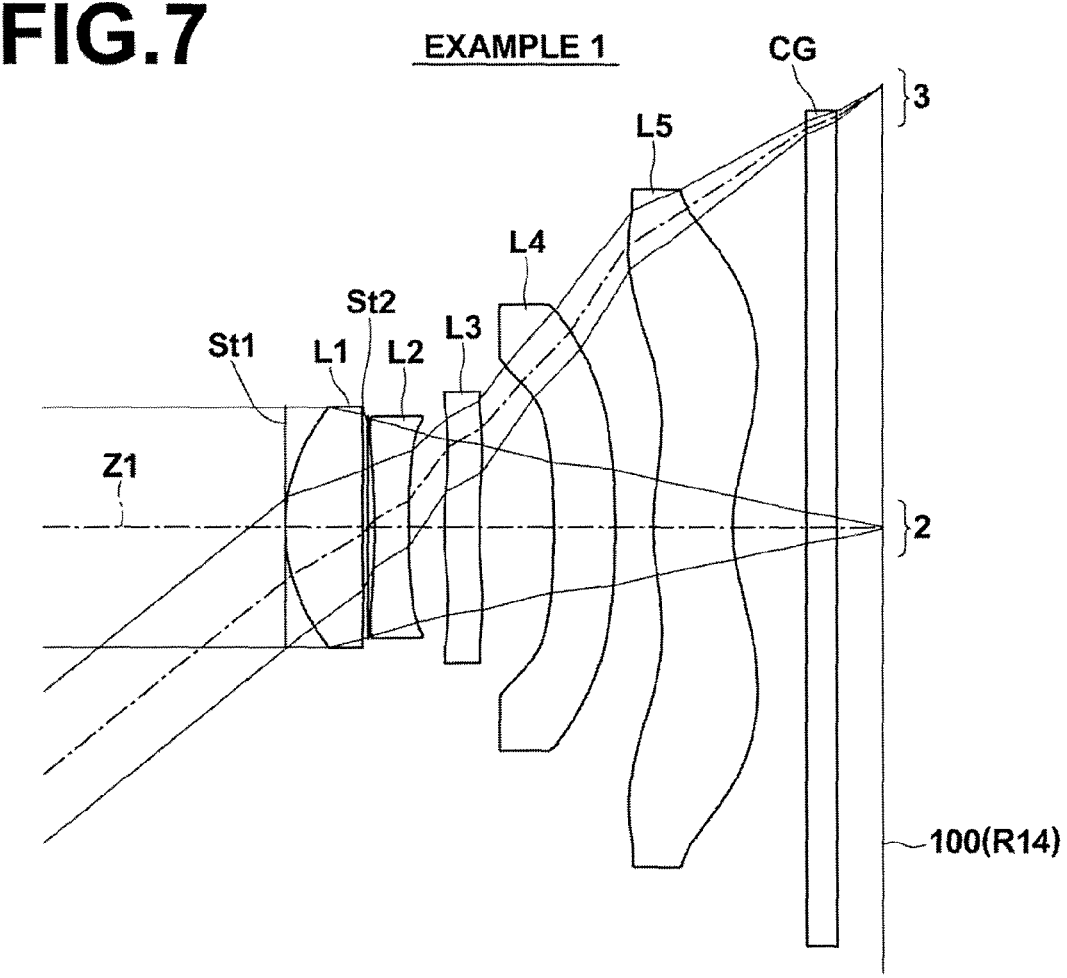
FIG. 7 is a diagram that illustrates the paths of light rays that pass through the imaging lens of FIG. 1.

FIG. 1 illustrates a first example of the configuration of an imaging lens according to an embodiment of the present disclosure. This example corresponds to the lens configuration of Numerical Example 1 (Table 1 and Table 2), to be described later. Similarly, FIG. 2 through FIG. 6 are sectional diagrams that illustrate second through sixth examples of lens configurations that correspond to Numerical Examples 2 through 6 (Table 3 through Table 12). In FIGS. 1 through 6, the symbol Ri represents the radii of curvature of ith surfaces, i being surface numbers that sequentially increase from the object side to the image side (imaging side), with the surface of a lens element most toward the object side designated as first. The symbol Di represents the distances between an ith surface and an i+1st surface along an optical axis Z1. Note that the basic configurations of the examples are the same, and therefore a description will be given of the imaging lens of FIG. 1 as a base, and the examples of FIGS. 2 through 6 will also be described as necessary. In addition, FIG. 7 is a diagram that illustrates the paths of light rays that pass through the imaging lens L of FIG. 1. FIG. 7 illustrates the paths of axial light beams 2 and maximum angle of view light beams 3 from an object at a distance of infinity, and a half value ω of a maximum angle of view.

The imaging lens L of the embodiment of the present disclosure is favorably employed in various imaging devices that employ imaging elements such as a CCD and a CMOS. The imaging lens L of the embodiment of the present disclosure is particularly favorable for use in comparatively miniature portable terminal devices, such as a digital still camera, a cellular telephone with a built in camera, a smart phone, a tablet type terminal, and a PDA. The imaging lens L is equipped with a first lens L1, a second lens L2, a third lens L3, a fourth lens L4, and a fifth lens L5, provided in this order from the object side.

Figure 14:
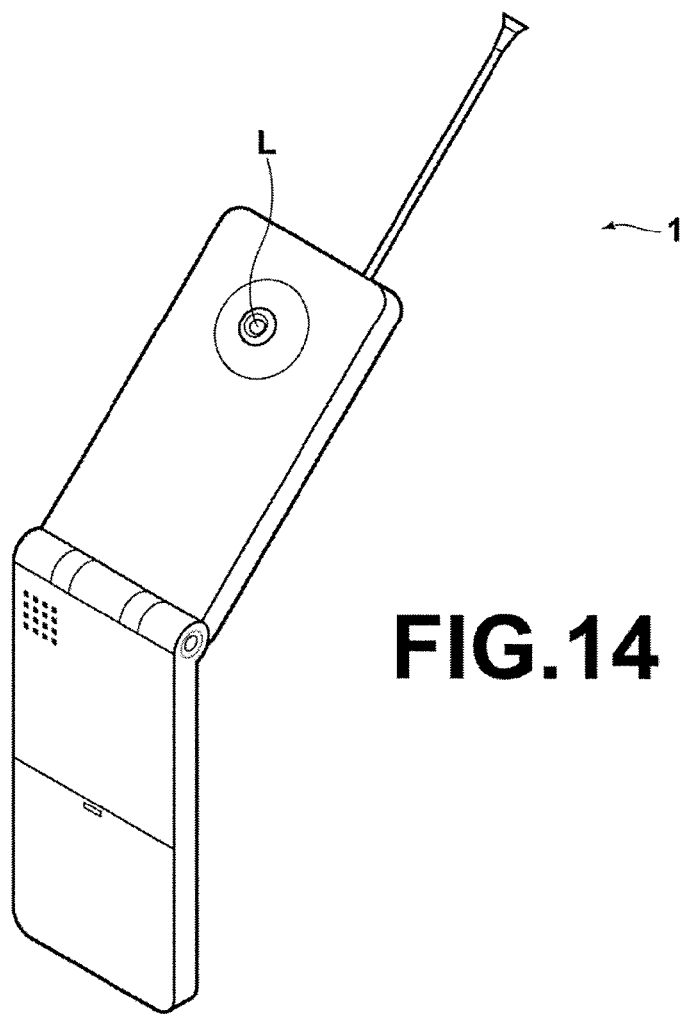
FIG. 14 is a diagram that illustrates a cellular telephone as an imaging apparatus equipped with the imaging lens of the present disclosure.

FIG. 14 schematically illustrates a cellular telephone as an imaging apparatus 1 according to an embodiment of the present disclosure. The imaging apparatus 1 of the embodiment of the present disclosure is equipped with the imaging lens L according to the embodiment of the present disclosure and an imaging element 100 (refer to FIG. 1) such as a CCD that outputs image signals corresponding to optical images formed by the imaging lens L. The imaging element 100 is provided at an image formation plane (imaging surface R14) of the imaging lens L.

Figure 15:
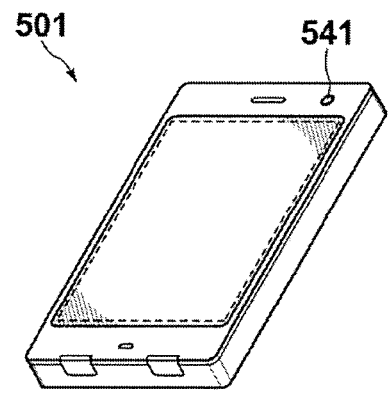
FIG. 15 is a diagram that illustrates a smart phone as an imaging apparatus equipped with the imaging lens of the present disclosure.

FIG. 15 schematically illustrates a smart phone as an imaging apparatus 501 according to an embodiment of the present disclosure. The imaging apparatus 501 of the embodiment of the present disclosure is equipped with a camera section 541 having the imaging lens L according to the embodiment of the present disclosure and an imaging element 100 (refer to FIG. 1) such as a CCD that outputs image signals corresponding to optical images formed by the imaging lens L. The imaging element 100 is provided at an image formation plane (imaging surface) of the imaging lens L.

Various optical members CG may be provided between the fifth lens L5 and the imaging element 100, depending on the configuration of the camera to which the lens is applied. A planar optical member such as a cover glass for protecting the imaging surface and an infrared cutoff filter may be provided, for example. In this case, a planar cover glass having a coating having a filtering effect such as an infrared cutoff filter coating or an ND filter coating, or a material that exhibits similar effects, may be utilized as the optical member CG.

Alternatively, the optical member CG may be omitted, and a coating may be administered on the fifth lens L5 to obtain the same effect as that of the optical member CG In this case, the number of parts can be reduced, and the total length of the lens can be shortened.

It is preferable for the imaging lens L to be equipped with an aperture stop St positioned at the object side of the surface of the second lens L2 toward the object side. In the case that the aperture stop St is positioned at the object side of the surface of the second lens L2 toward the object side in this manner, increases in the incident angles of light rays that pass through the optical system and enter the image formation plane (imaging element) can be suppressed, particularly at peripheral portions of an imaging region. It is more preferable for the aperture stop St to be positioned at the object side of the surface of the first lens L1 toward the object side, in order to cause this advantageous effect to become more prominent. Note that the expression "positioned at the object side of the surface of the second lens L2 toward the object side" means that the position of the aperture stop in the direction of the optical axis is at the same position as the intersection of marginal axial rays of light and the surface of the second lens L2 toward the object side, or more toward the object side than this position. Similarly, the expression "positioned at the object side of the surface of the first lens L1 toward the object side" means that the position of the aperture stop in the direction of the optical axis is at the same position as the intersection of marginal axial rays of light and the surface of the first lens L1 toward the object side, or more toward the object side than this position.

In the embodiments, the lenses having the configurations of the fourth and fifth examples (FIGS. 4 and 5) are examples in which the aperture stop St is positioned at the object side of the surface of the first lens L1 toward the object side, and the lenses having the configurations of the first, second, third, and sixth examples (FIGS. 1, 2, 3, and 6) are examples in which the aperture stop is positioned at the object side of the surface of the second lens L2 toward the object side. Note that the aperture stops St illustrated in the figures do not necessarily represent the sizes or shapes thereof, but indicate the positions thereof on the optical axis Z1.

Note that in the case that the aperture stop St is positioned at the object side of the surface of the second lens L2 toward the object side, a flare stop may further be provided at the object side of the surface of the first lens L1 toward the object side in order to suppress flare components and ghost components. In the embodiments, the lenses having the configurations of the first, second, third, and sixth examples (FIGS. 1, 2, 3, and 6) are examples equipped with flare stops. Note that in FIG. 1, FIG. 2, FIG. 3, and FIG. 6, the flare stops are denoted by reference number St1, and the aperture stops are denoted by reference number St2. In this case, the aperture stops St2 are stops that restrict F numbers, and the flare stops St1 are stops that restrict light beams at peripheral angles of view.

Further, it is preferable for the aperture stop St (or the flare stop) to be positioned at the image side of the apex of the surface of the first lens L1 toward the object side, in the case that the aperture stop St is positioned at the object side of the surface of the first lens L1 toward the object side. The total length of the imaging lens including the aperture stop St can be shortened in the case that the aperture stop St is positioned at the image side of the apex of the surface of the first lens L1. In the present embodiment, the aperture stop St is positioned at the image side of the apex of the surface of the first lens L1. However, the present disclosure is not limited to such a configuration, and the aperture stop may be positioned at the apex of the surface of the first lens L1, or positioned at the object side of the apex of the surface. A case in which the aperture stop St is positioned at the object side of the apex of the surface of the first lens L1 is somewhat disadvantageous from the viewpoint of securing peripheral light intensity compared to a case in which the aperture stop St is positioned at the image side of the apex of the surface of the first lens L1. However, increases in the incident angles of light rays that pass through the optical system and enter the image formation plane (imaging element) can be further suppressed at the peripheral portions of the imaging region.

Alternatively, the aperture stop St (St2) may be positioned between the first lens L1 and the second lens L2, as in Examples 1, 2, 3, and 6 illustrated in FIGS. 1, 2, 3, and 6. In this case, field curvature can be favorably corrected. Note that a case that the aperture stop St is positioned between the first lens L1 and the second lens L2 is disadvantageous in securing telecentric properties compared to a case in which the aperture stop St is positioned at the object side of the surface of the first lens L1 toward the object side in the direction of the optical axis. That is, this configuration is disadvantageous from the viewpoint of causing principal rays of light to become as parallel as possible to the optical axis (causing incident angles at the imaging surface to be as close to zero as possible). However, favorable optical properties can be realized, by applying imaging elements in which deterioration of light receiving efficiency and the occurrence of color mixing is reduced compared to conventional imaging elements, which have been realized accompanying developments in imaging element technology.

In the imaging lens L, the first lens L1 has a positive refractive power in the vicinity of the optical axis, and is of a meniscus shape having a convex surface toward the object side in the vicinity of the optical axis. Moving the position of the rearward principal point toward the object side is facilitated by configuring the first lens L1 to have a positive refractive power and to be of a meniscus shape having a convex surface toward the object side in the vicinity of the optical axis, as shown in each of the Examples.

The second lens L2 has a negative refractive power in the vicinity of the optical axis, and is of a shape having a concave surface toward the image side in the vicinity of the optical axis. Thereby, chromatic aberration can be favorably corrected and a shortening of the total length of the lens can be favorably realized. In addition, the second lens L2 may be of a biconcave shape. In this case, spherical aberration can be particularly favorably corrected.

The third lens L3 has a positive refractive power in the vicinity of the optical axis. Thereby, spherical aberration can be favorably corrected. In addition, the third lens L3 is of a meniscus shape having a convex surface toward the object side in the vicinity of the optical axis. Thereby, the rearward principal point of the third lens L3 can be favorably moved toward the object side, and therefore a shortening of the total length of the lens can be favorably realized.

The fourth lens L4 has a negative refractive power in the vicinity of the optical axis. By configuring the fourth lens L4 and the fifth lens L5 to be described later to have negative refractive powers in the vicinity of the optical axis, negative refractive power can be distributed between the fourth lens L4 and the fifth lens L5. This configuration is advantageous from the viewpoints of correcting distortion and decreasing the incident angles of light rays at intermediate angles of view with respect to the imaging surface. In addition, by configuring the fourth lens L4 and the fifth lens L5 to be described later to have negative refractive powers in the vicinity of the optical axis, the imaging lens as a whole can be of a telephoto type configuration, if the first lens L1 through the third lens L3 are considered to be a positive lens group, and the fourth lens L4 and the fifth lens L5 are considered to be a negative lens group. Therefore, the rearward principal point of the imaging lens as a whole can be moved toward the object side, and the total length of the lens can be favorably shortened. In addition, the fourth lens L4 may be configured to be of a meniscus shape having a concave surface toward the object side as in Example 1. In this case, astigmatism can be favorably corrected.

The fifth lens L5 has a negative refractive power in the vicinity of the optical axis. By providing a lens having a negative refractive power in the vicinity of the optical axis as the lens most toward the image side in the imaging lens, the imaging lens as a whole can be more favorably be of a telephoto type configuration, and the total length of the lens can be favorably shortened. In addition, field curvature can be favorably corrected by the fifth lens L5 having a negative refractive power in the vicinity of the optical axis. In addition, in the case that the fifth lens L5 has a concave surface toward the image side in the vicinity of the optical axis, field curvature can be favorably corrected while more favorably realizing a shortening of the total length of the lens. It is preferable for the fifth lens L5 to be of a meniscus shape having a concave surface toward the image side in the vicinity of the optical axis, as in each of the Examples.

In addition, the surface of the fifth lens L5 toward the image side has at least one inflection point within the effective diameter thereof. The "inflection point" on the surface of the fifth lens L5 toward the image side refers to a point at which the shape of the surface of the fifth lens L5 toward the image side changes from a convex shape to a concave shape (or from a concave shape to a convex shape) with respect to the image side. The position of the inflection point may be any arbitrary position within the effective diameter of the surface of the fifth lens L5 toward the image side. As shown in each of the Examples, increases in the incident angles of light rays that pass through the optical system with respect to the imaging surface (imaging element) can be suppressed, particularly at peripheral portions of the imaging region.

According to the imaging lens L described above, the configurations of each of the first lens L1 through the fifth lens L5 are optimized as lens elements in a lens configuration having a total of five lenses. Therefore, a lens system that achieves a shortened total length and has high resolution can be realized.

It is preferable for at least one of the surfaces of each of the first lens L1 through the fifth lens L5 of the imaging lens L to be an aspherical surface, in order to improve performance.

In addition, it is preferable for each of the lenses L1 through L5 that constitute the imaging lens L to be a single lens, not a cemented lens. In the case that each of the first lens L1 through the fifth lens L5 that constitute the imaging lens L is a single lens, the number of aspherical lens surfaces will be greater than that for a case in which any of the first lens L1 through the fifth lens L5 is a cemented lens. Therefore, the degree of freedom in the design of each lens will increase. As a result, the total length of the lens can be favorably shortened.

Next, the operation and effects of conditional formulae related to the imaging lens L will be described in greater detail.

First, It is preferable for the focal length f1 of the first lens and the combined focal length f23 of the second lens and the third lens L3 to satisfy Conditional Formula (1) below.

$$-3<f1/f23<-0.38 \quad (1)$$

Conditional Formula (1) defines a preferable range of numerical values for the ratio of the focal length f1 of the first lens L1 with respect to the combined focal length f23 of the second lens L2 and the third lens L3. By maintaining the refractive power of the first lens L1 such that the value of f1/f23 is not less than or equal to the lower limit defined in Conditional Formula (1), the combined negative refractive power of the second lens L2 and the third lens L3 will be small with respect to the refractive power of the first lens L1. As a result, the total length of the lens can be favorably shortened. By securing the refractive power of the first lens L1 such that the value of f1/f23 is not greater than or equal to the upper limit defined in Conditional Formula (1), the combined negative refractive power of the second lens L2 and the third lens L3 will be large with respect to the refractive power of the first lens L1. As a result, longitudinal chromatic aberration can be particularly favorably corrected. It is more preferable for Conditional Formula (1-1) to be satisfied, and even more preferable for Conditional Formula (1-2) to be satisfied, in order to cause these advantageous effects to become more prominent.

$$-2<f1/f23<-0.4 \quad (1-1)$$

$$-1<f1/f23<-0.41 \quad (1-2)$$

In addition, it is preferable for the focal length f2 of the second lens L2 and the focal length f of the entire lens system to satisfy Conditional Formula (2) below.

$$-3<f/f2<-0.75 \quad (2)$$

Conditional Formula (2) defines a preferable range of numerical values for the ratio of the focal length f of the entire lens system with respect to the focal length f2 of the second lens L2. By maintaining the refractive power of the second lens L2 such that the value of f/f2 is not less than or equal to the lower limit defined in Conditional Formula (2), the refractive power of the second lens L2 will not become excessively strong with respect to the refractive power of the entire lens system. As a result, the total length of the lens can be favorably shortened. By securing the refractive power of the second lens L2 such that the value of f/f2 is not greater than or equal to the upper limit defined in Conditional Formula (2), the refractive power of the second lens L2 will not become excessively weak with respect to the refractive power of the entire lens system. As a result, As a result, longitudinal chromatic aberration can be particularly favorably corrected. It is more preferable for Conditional Formula (1-1) to be satisfied, and even more preferable for Conditional Formula (1-2) to be satisfied, in order to cause these advantageous effects to become more prominent.

$$-2<f/f2<-0.8 \quad (2-1)$$

$$-1<f/f2<-0.82 \quad (2-2)$$

It is preferable for the paraxial radius of curvature R3f of the surface of the third lens toward the object side and the paraxial radius of curvature R3r of the surface of the third lens toward the image side to satisfy Conditional Formula (3) below.

$$-0.18<(R3f-R3r)/(R3f+R3r)<0.5 \quad (3)$$

Conditional Formula (3) defines a preferable range of numerical values for the paraxial radius of curvature R3f of the surface of the third lens toward the object side and the paraxial radius of curvature R3r of the surface of the third lens toward the image side. By setting the paraxial radius of curvature R3f of the surface of the third lens toward the object side and the paraxial radius of curvature R3r of the surface of the third lens toward the image side such that the value of (R3f−R3r)/(R3f+R3r) is not less than or equal to the lower limit defined in Conditional Formula (3), the total length of the lens can be favorably shortened. By setting the paraxial radius of curvature R3f of the surface of the third lens toward the object side and the paraxial radius of curvature R3r of the surface of the third lens toward the image side such that the value of (R3f−R3r)/(R3f+R3r) is not greater than or equal to the upper limit defined in Conditional Formula (3), spherical aberration can be favorably corrected. It is more preferable for Conditional Formula (3-1) to be satisfied, and even more preferable for Conditional Formula (3-2) to be satisfied, in order to cause these advantageous effects to become more prominent.

$$-0.15<(R3f-R3r)/(R3f+R3r)<0.2 \quad (3-1)$$

$$-0.12<(R3f-R3r)/(R3f+R3r)<0 \quad (3-2)$$

It is preferable for the refractive power Pair67 (1/focal length) of an air lens formed between the third lens L3 and the fourth lens L4 to satisfy Conditional Formula (4) below.

$$-0.45<Pair67<-0.1 \quad (4)$$

Conditional Formula (4) defines a preferable range of numerical values for the refractive power Pair67 of an air lens formed between the third lens L3 and the fourth lens L4. By maintaining the refractive power of an air lens formed between the third lens L3 and the fourth lens L4 such that it is not less than or equal to the lower limit defined in Conditional Formula (4), distortion can be favorably corrected. By securing the refractive power of an air lens formed between the third lens L3 and the fourth lens L4 such that it is not greater than or equal to the upper limit defined in Conditional Formula (4), astigmatism can be favorably corrected. It is preferable for Conditional Formula (4-1) to be satisfied, and more preferable for Conditional Formula (4-2) to be satisfied, in order to cause these advantageous effects to become more prominent.

$$-0.4<Pair67<-0.2 \quad (4-1)$$

$$-0.35<Pair67<-0.25 \quad (4-2)$$

In addition, it is preferable for the focal length f of the entire lens system, the half angle of view ω, and the paraxial radius of curvature R5r of the surface of the fifth lens L5 toward the image side to satisfy Conditional Formula (5) below.

$$0.5<f\cdot\tan\omega/R5r<10 \quad (5)$$

Conditional Formula (5) defines a preferable range of numerical values for the ratio of a paraxial image height (f·tan ω) with respect to the paraxial radius of curvature R5r of the surface of the fifth lens L5 toward the image side. By setting the paraxial image height (f·tan ω) with respect to the paraxial radius of curvature R5r of the surface of the fifth lens L5 toward the image side such that the value of f·tan ω/R5r is not less than or equal to the lower limit defined in Conditional Formula (5), the absolute value of the paraxial radius of curvature R5r of the surface of the fifth lens L5 toward the image side, which is the surface most toward the image side in the imaging lens L, will not be excessively large with respect to the paraxial image height (f·tan ω). As a result, field curvature can be sufficiently corrected while realizing a shortening of the total length. In addition, by setting the paraxial image height (f·tan ω) with respect to the paraxial radius of curvature R5r of the surface of the fifth lens L5 toward the image side such that the value of f·tan ω/R5r is not greater than or equal to the upper limit defined in Conditional Formula (5), the absolute value of the paraxial radius of curvature R5r of the surface of the fifth lens L5 toward the image side, which is the surface most toward the image side in the imaging lens, will not be excessively small with respect to the paraxial image height (f·tan ω). Thereby, increases in the incident angle of light rays that pass through the optical system and enter the image formation plane (imaging element) can be suppressed, particularly at intermediate angles of view. It is preferable for Conditional Formula (5-1) to be satisfied, in order to cause these advantageous effects to become more prominent.

$$0.7 < f \cdot \tan \omega / R5r < 3 \tag{5-1}$$

In addition, it is preferable for the combined focal length f45 of the fourth lens L4 and the fifth lens L5 and the focal length f of the entire lens system to satisfy Conditional Formula (6) below.

$$-0.46 < f/f45 < 0 \tag{6}$$

Conditional Formula (6) defines a preferable range of numerical values for the ratio of the focal length f of the entire lens system with respect to the combined focal length f45 of the fourth lens L4 and the fifth lens L5. By maintaining the combined refractive power f45 of the fourth lens L4 and the fifth lens L5 such that the value of f/f45 is not less than or equal to the lower limit defined in Conditional Formula (6), the combined refractive power of the fourth lens L4 and the fifth lens L5 will not become excessively strong with respect to the refractive power of the entire lens system. As a result, increases in the incident angle of light rays that pass through the optical system and enter the image formation plane (imaging element) can be suppressed, particularly at intermediate angles of view. By securing the combined refractive power f45 of the fourth lens L4 and the fifth lens L5 such that the value of f/f45 is not greater than or equal to the upper limit defined in Conditional Formula (6), the combined refractive power of the fourth lens L4 and the fifth lens L5 will not become excessively weak with respect to the refractive power of the entire lens system. As a result, the total length of the lens can be favorably shortened, while field curvature can be favorably corrected. It is preferable for Conditional Formula (6-1) to be satisfied, and more preferable for Conditional Formula (6-2) to be satisfied, in order to cause these advantageous effects to become more prominent.

$$-0.45 < f/f45 < 0 \tag{6-1}$$

$$-0.42 < f/f45 < -0.2 \tag{6-2}$$

In addition, it is preferable for the refractive index Nd3 of the material of the third lens L3 with respect to the d line to satisfy Conditional Formula (7) below.

$$1.6 < Nd3 \tag{7}$$

Conditional Formula (7) defines a preferable range of numerical values for the refractive index Nd3 of the material of the third lens L3 with respect to the d line. By maintaining the refractive index Nd3 of the third lens such that it is not less than or equal to the lower limit defined in Conditional Formula (7), field curvature can be particularly favorably corrected. It is more preferable fro Conditional Formula (7-1) to be satisfied, in order to cause this advantageous effect to become more prominent.

$$1.62 < Nd3 \tag{7-1}$$

In addition, it is preferable for the Abbe's number νd3 of the material of the third lens L3 with respect to the d line to satisfy Conditional Formula (8) below.

$$\nu d3 < 30 \tag{8}$$

Conditional Formula (8) defines a preferable range of numerical values for the Abbe's number νd3 of the material of the third lens L3 with respect to the d line. By maintaining the Abbe's number νd3 of the third lens such that it is not less than or equal to the lower limit defined in Conditional Formula (8), lateral chromatic aberration can be particularly favorably corrected. It is more preferable fro Conditional Formula (8-1) to be satisfied, in order to cause this advantageous effect to become more prominent.

$$\nu d3 < 25 \tag{8-1}$$

Next, the imaging lenses of Example 2 through Example 6 will be described in detail with reference to FIG. 2 through FIG. 6. All of the surfaces of all of the first lens L1 through the fifth lens L5 are aspherical surfaces in the imaging lenses of Example 1 through Example 6 illustrated in FIG. 1 through FIG. 6. In addition, the imaging lenses of Example 2 through Example 6 are all constituted by five lenses, including: a first lens L1 having a positive refractive power, which is of a meniscus shape having a convex surface toward the object side; a second lens L2 having a negative refractive power and a concave surface toward the image side; a third lens L3 having a positive refractive power, which is of a meniscus shape having a convex surface toward the object side; a fourth lens L4 having a negative refractive power; and a fifth lens L5 having a negative refractive power and at least one inflection point on the surface thereof toward the image side. For this reason, only other details of the configurations of the lenses will be described for Example 2 through Example 6. In addition, the operational effects of the configurations which are common among the first Example through sixth Example are the same. Therefore, such configurations and operational effects will be described for Examples having lower numbers, and descriptions of such common configurations and operational effects will be omitted for the other Examples.

Figure 2:
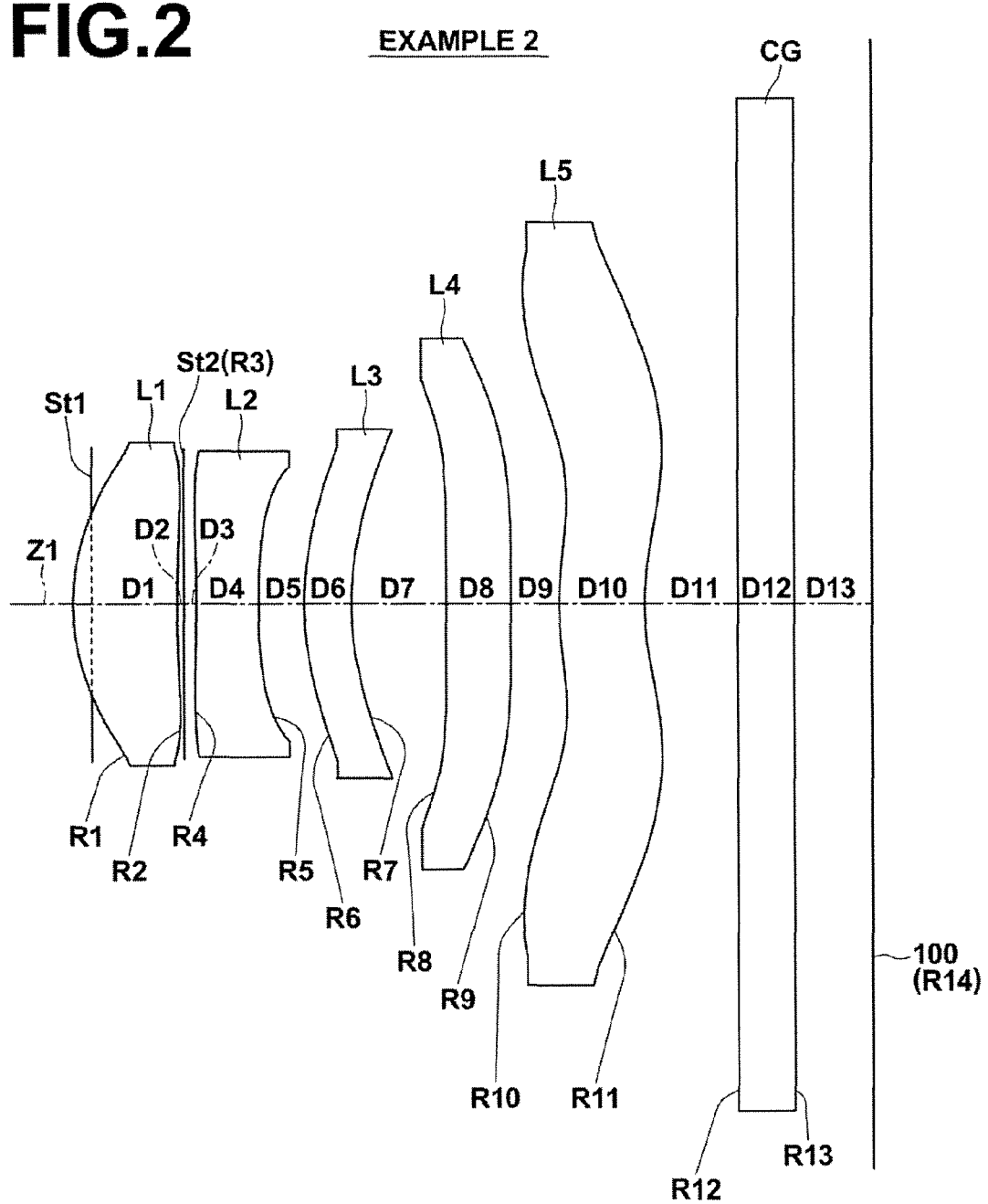
FIG. 2 is a sectional diagram that illustrates a second example of the configuration of an imaging lens according to an embodiment of the present disclosure, and corresponds to a lens of Example 2.
Figure 3:
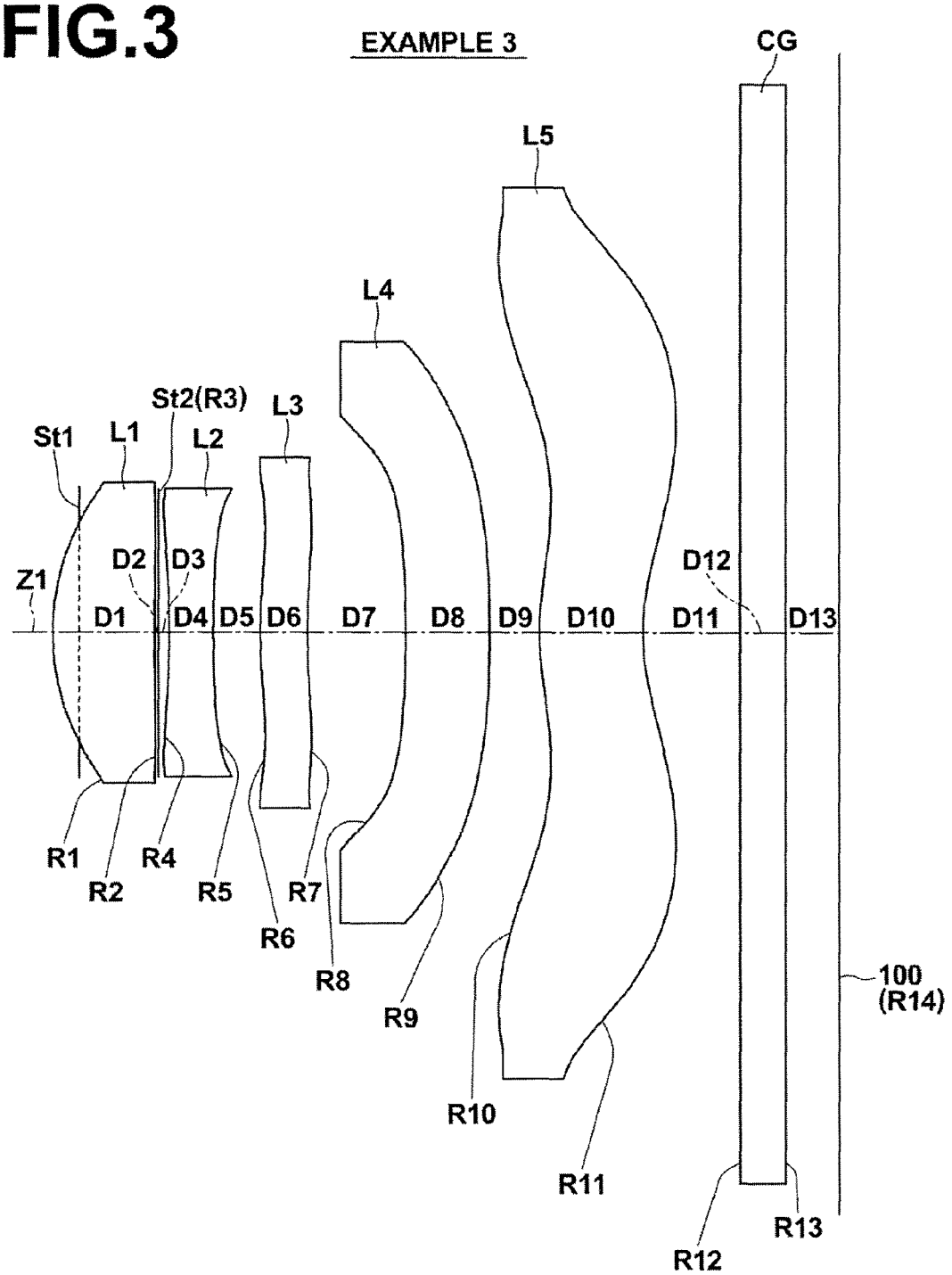
FIG. 3 is a sectional diagram that illustrates a third example of the configuration of an imaging lens according to an embodiment of the present disclosure, and corresponds to a lens of Example 3.
Figure 4:
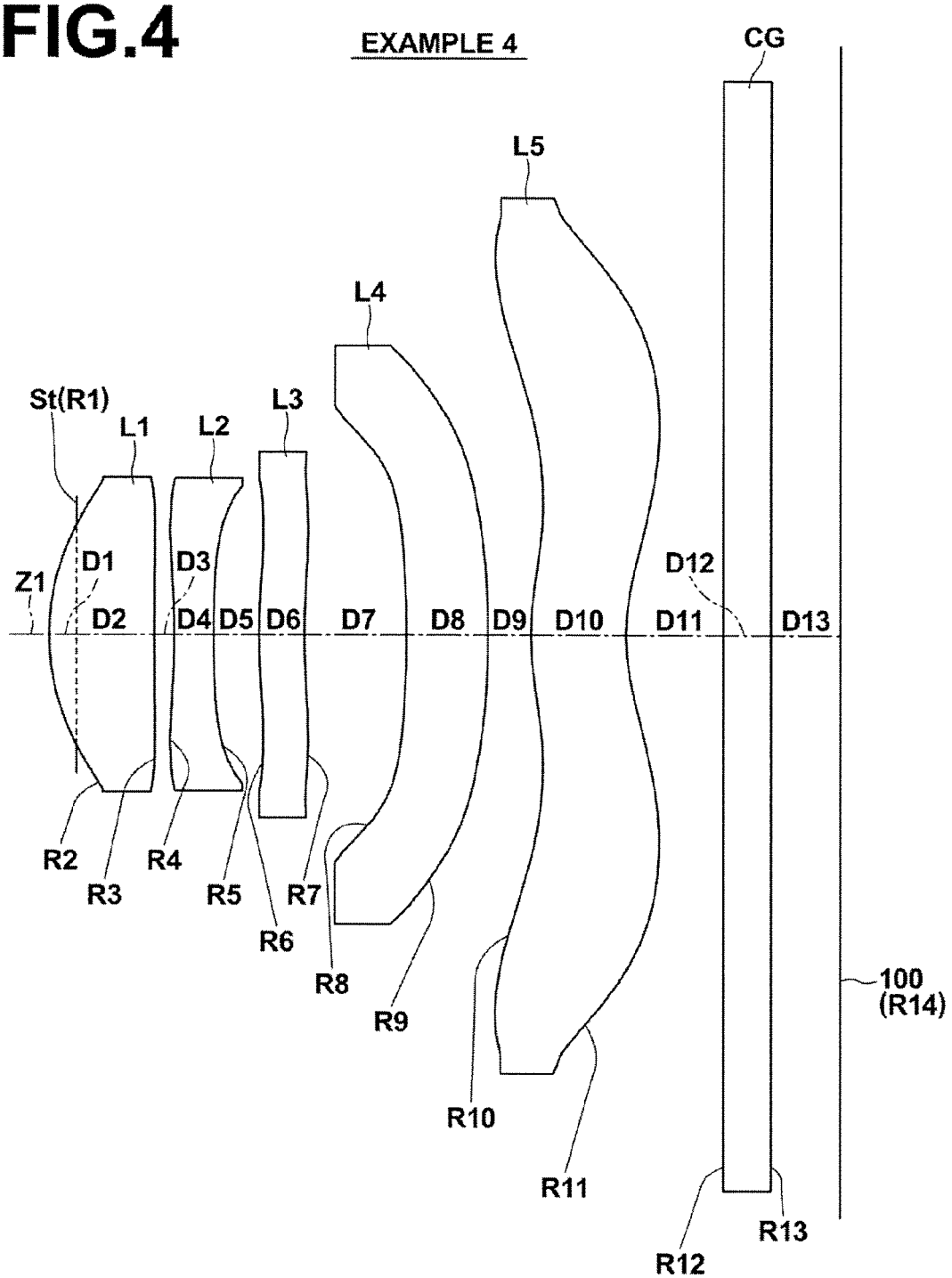
FIG. 4 is a sectional diagram that illustrates a fourth example of the configuration of an imaging lens according to an embodiment of the present disclosure, and corresponds to a lens of Example 4.
Figure 5:
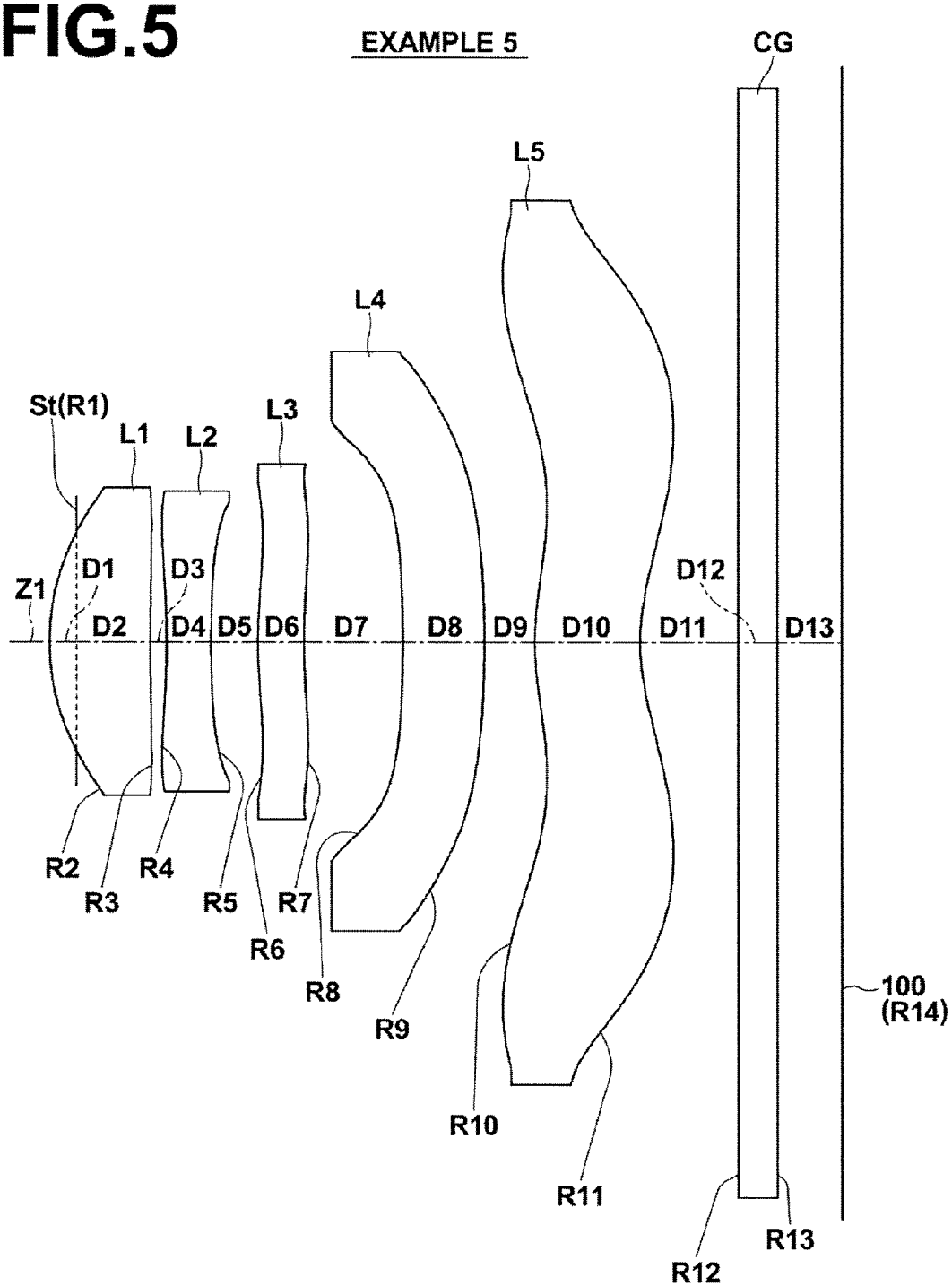
FIG. 5 is a sectional diagram that illustrates a fifth example of the configuration of an imaging lens according to an embodiment of the present disclosure, and corresponds to a lens of Example 5.
Figure 6:
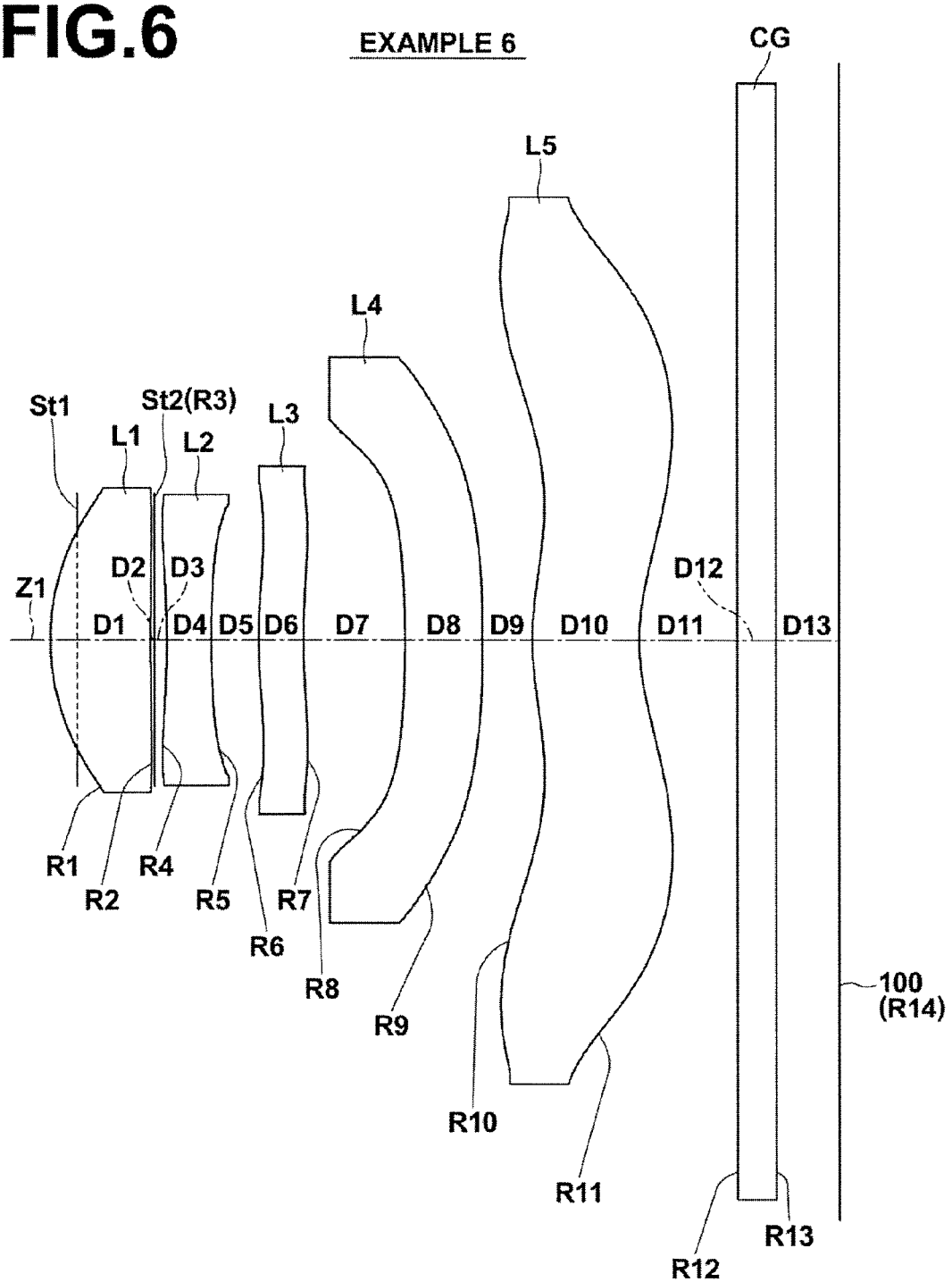
FIG. 6 is a sectional diagram that illustrates a sixth example of the configuration of an imaging lens according to an embodiment of the present disclosure, and corresponds to a lens of Example 6.

The fourth lens L4 of the imaging lens L of Example 2 illustrated in FIG. 2 is configured to be of a meniscus shape having a concave surface toward the image side. The first lens L1 through the fifth lens L5 of the imaging lens L of Example 2 have the same configurations as those of the imaging lens L of Example 1 other than the fourth lens L4 being configured to be of a meniscus shape having a concave surface toward the image side. By configuring the fourth lens L4 to be of a meniscus shape having a concave surface toward the image side, the total length of the lens can be favorably shortened. In addition, operational effects corresponding to those obtained by the configurations of the first lens L1 through the fifth lens L5 which are the same as those of Example 1 are obtained in Example 2. Note that the imaging lens L of Example 2 does not satisfy Conditional Formulae (3-2), (7), and (8).

The first lens L1 through the fifth lens L5 of the imaging lenses L of Example 3 through Example 6 illustrated in FIG. 3 through FIG. 6 have the same lens configurations as those of Example 1. The same operational effects as those obtained by those of Example 1 are obtained by the lens configurations of these lenses. Note that the imaging lens L of Example 3 does not satisfy Conditional Formula (6-2).

As described above, in the imaging lens L according to the embodiments of the present disclosure, the configurations of each lens element is optimized in a lens configuration having a total of five lenses. Therefore, a lens system that achieves a shortened total length and has high resolution can be realized.

In addition, further improved imaging performance can be realized by satisfying the above preferred conditions appropriately. In addition, the imaging apparatuses according to the embodiments of the present disclosure output image signals corresponding to optical images formed by the high performance imaging lenses according to the embodiments of the present disclosure. Therefore, photographed images having high resolution from a central angle of view to peripheral angles of view can be obtained.

Next, specific examples of numerical values of the imaging lens of the present disclosure will be described. A plurality of examples of numerical values will be summarized and explained below.

Table 1 and Table 2 below show specific lens data corresponding to the configuration of the imaging lens illustrated in FIG. 1. Table 1 shows basic lens data of the imaging lens, and Table 2 shows data related to aspherical surfaces. In the lens data of Table 1, ith lens surface numbers that sequentially increase from the object side to the image side, with the surface of the lens element at the most object side designated as first, are shown in the column Si for the imaging lens of Example 1. The radii of curvature (mm) of ith surfaces from the object side corresponding to the symbols Ri illustrated in FIG. 1 are shown in the column Ri. Similarly, the distances (mm) between an ith surface Si and an i+1st surface Si+1 from the object side along the optical axis Z are shown in the column Di. The refractive indices of jth optical elements from the object side with respect to the d line (wavelength: 587.6 nm) are shown in the column Ndj. The Abbe's numbers of the jth optical elements with respect to the d line are shown in the column vdj. Note that the values of the focal length f (mm) of the entire lens system and the back focus (Bf) are also shown as items of the lens data. Note that the back focus Bf is shown as an air converted value.

In the imaging lens of Example 1, both of the surfaces of the first lens L1 through the fifth lens L5 are all aspherical in shape. In the basic lens data of Table 1, numerical values of radii of curvature in the vicinity of the optical axis (paraxial radii of curvature) are shown as the radii of curvature of the aspherical surfaces.

Table 2 shows aspherical surface data of the imaging lens of Example 1. In the numerical values shown as the aspherical surface data, the symbol "E" indicates that the numerical value following thereafter is a "power index" having 10 as a base, and that the numerical value represented by the index function having 10 as a base is to be multiplied by the numerical value in front of "E". For example, "1.0E-02" indicates that the numerical value is "$1.0 \cdot 10^{-2}$".

The values of coefficients Ai and KA represented by the aspherical surface shape formula (A) below are shown as the aspherical surface data. In greater detail, Z is the length (mm) of a normal line that extends from a point on the aspherical surface having a height h to a plane (a plane perpendicular to the optical axis) that contacts the apex of the aspherical surface.

$$Z = \frac{C \times h^2}{1 + \sqrt{1 - KA \times C^2 \times h^2}} + \sum_i Ai \times h^i \quad (A)$$

wherein: Z is the depth of the aspherical surface (mm), h is the distance from the optical axis to the surface of the lens (height) (mm), C is the paraxial curvature=1/R (R is the paraxial radius of curvature), Ai is an nth ordinal aspherical surface coefficient (i is an integer 3 or greater), and KA is an aspherical surface coefficient.

Specific lens data corresponding to the configurations of the imaging lenses illustrated in FIG. 2 through FIG. 6 are shown in Table 3 through Table 12 as Example 2 through Example 6 in the same manner as for the imaging lens of Example 1. In the imaging lenses of Examples 1 through 6, both of the surfaces of the first lens L1 through the fifth lens L5 are all aspherical surfaces.

Figure 8:
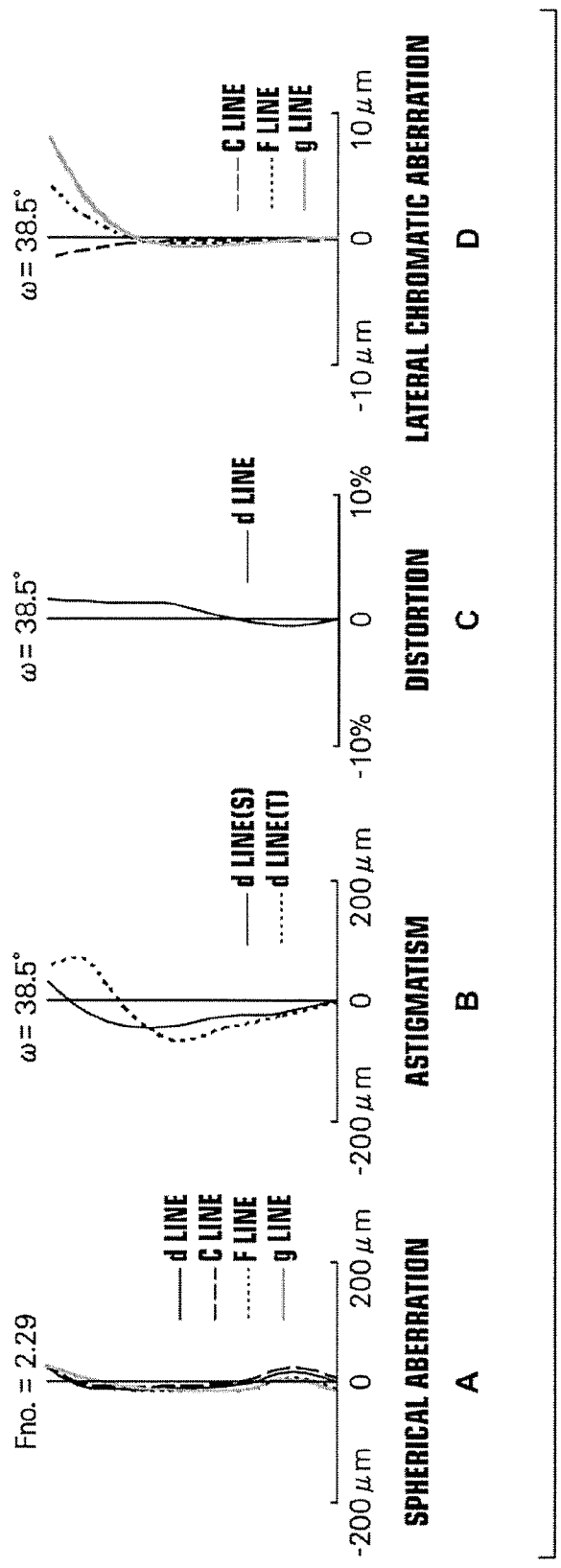
FIG. 8 is a collection of diagrams that illustrate aberrations of the imaging lens of Example 1, wherein A illustrates spherical aberration, B illustrates astigmatism, C illustrates distortion, and D illustrates lateral chromatic aberration.

Note that a flare stop having a diameter of 1.70 mm is provided at the position of the apex of the surface of the first lens L1 in Example 1, a flare stop having a diameter of 1.67 mm is provided at a position 0.101 mm toward the image side from the apex of the surface of the first lens L1 in Example 2, a flare stop having a diameter of 1.56 mm is provided at a position 0.145 mm toward the image side from the apex of the surface of the first lens L1 in Example 3, and a flare stop having a diameter of 1.59 mm is provided at a position 0.144 mm toward the image side from the apex of the surface of the first lens L1 in Example 6. However, these flare stops are omitted from Tables 1, 3, 5, and 11. A through D of FIG. 8 are diagrams that illustrate aberrations of the imaging lens of Example 1, that respectively illustrate the spherical aberration, the astigmatism, the distortion, and the lateral chromatic aberration (chromatic aberration of magnification). Each of the diagrams that illustrate the spherical aberration, the astigmatism (field curvature), and the distortion illustrate aberrations using the d line (wavelength: 587.56 nm) as a reference wavelength. The diagrams that illustrate spherical aberration and lateral chromatic aberration also show aberrations related to the g line (wavelength: 435.83 nm), the F line (wavelength: 486.1 nm), and the C line (wavelength: 656.27 nm). In the diagram that illustrates astigmatism, aberration in the sagittal direction (S) is indicated by a solid line, while aberration in the tangential direction (T) is indicated by a broken line. In addition, "Fno." denotes an F number, and "ω" denotes a half value of the maximum angle of view.

Figure 9:
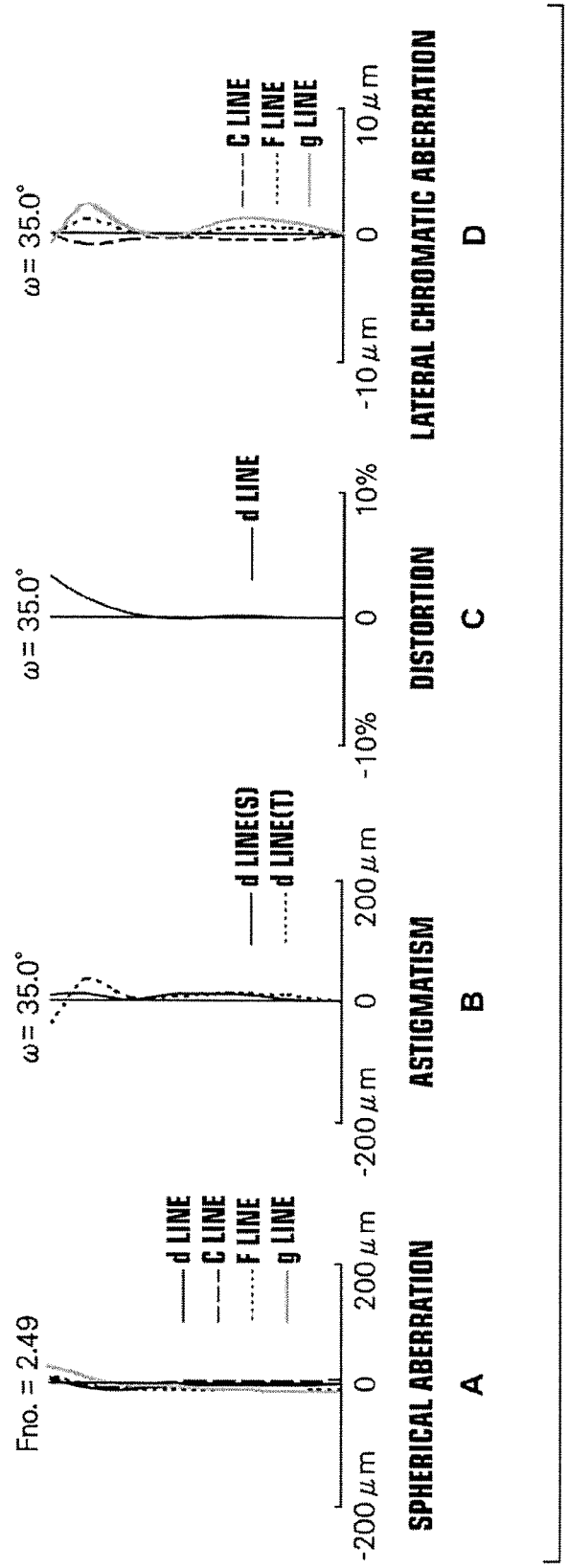
FIG. 9 is a collection of diagrams that illustrate aberrations of the imaging lens of Example 2, wherein A illustrates spherical aberration, B illustrates astigmatism, C illustrates distortion, and D illustrates lateral chromatic aberration.
Figure 10:
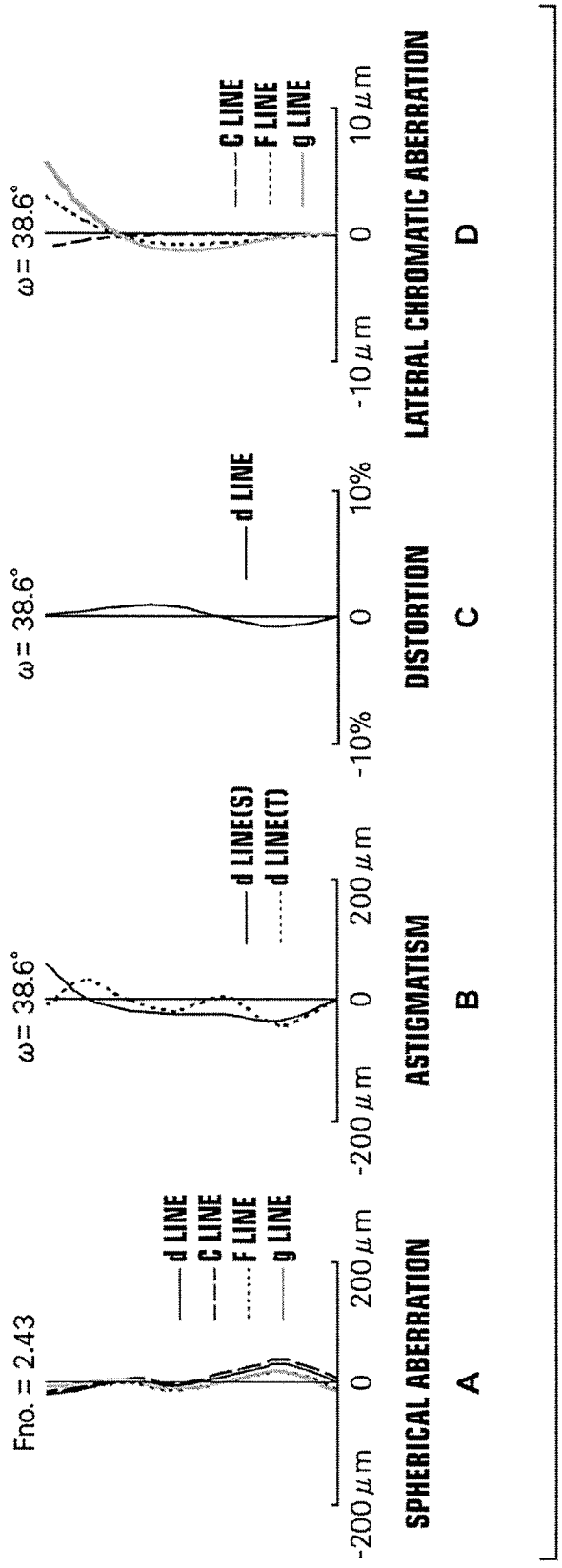
FIG. 10 is a collection of diagrams that illustrate aberrations of the imaging lens of Example 3, wherein A illustrates spherical aberration, B illustrates astigmatism, C illustrates distortion, and D illustrates lateral chromatic aberration.
Figure 11:
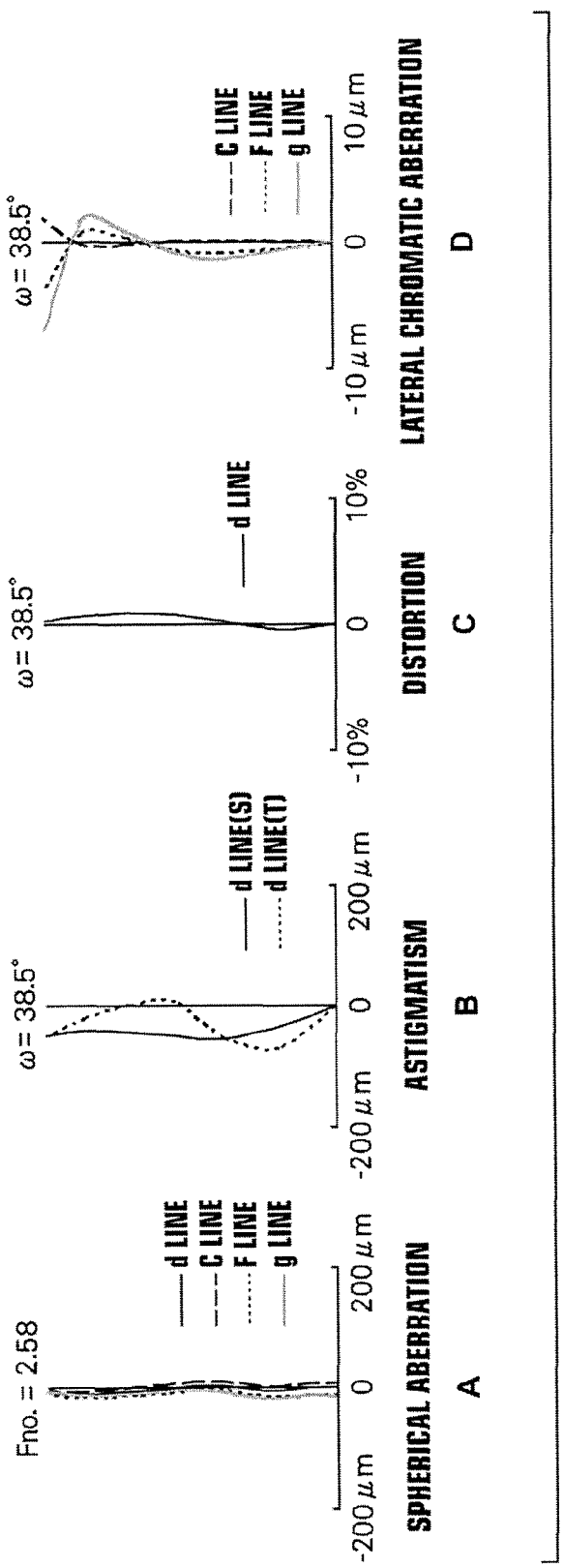
FIG. 11 is a collection of diagrams that illustrate aberrations of the imaging lens of Example 4, wherein A illustrates spherical aberration, B illustrates astigmatism, C illustrates distortion, and D illustrates lateral chromatic aberration.
Figure 12:
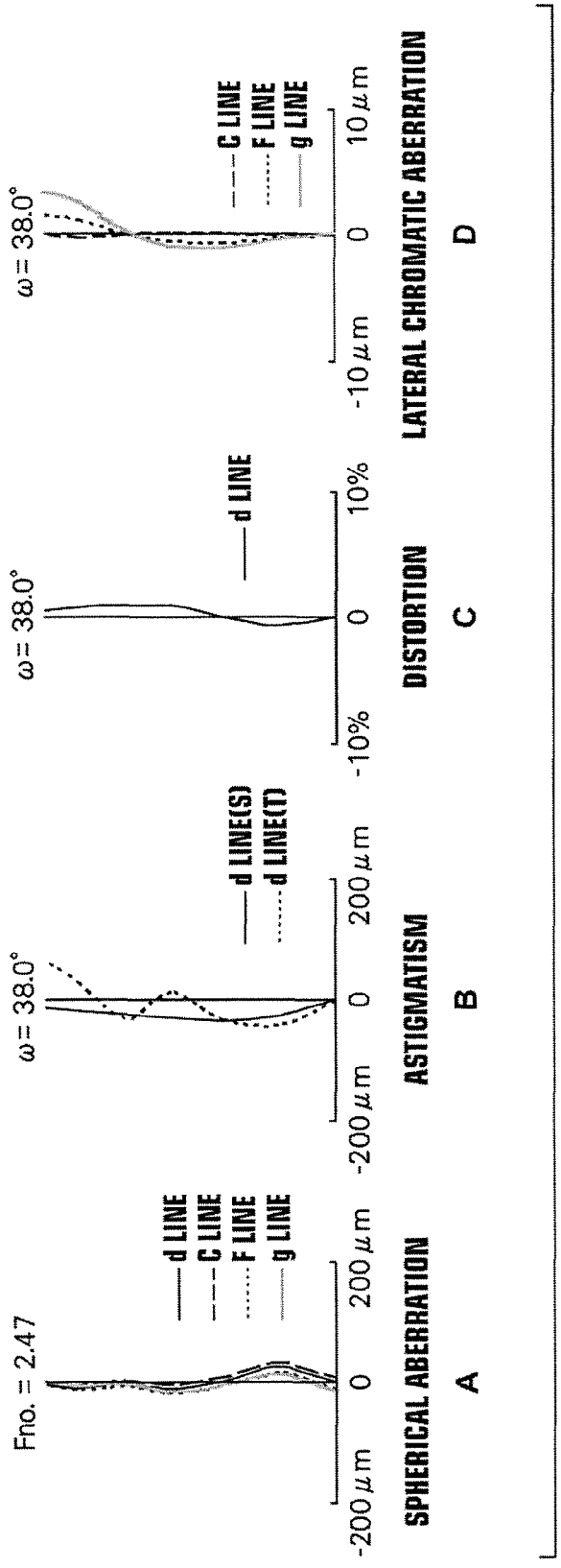
FIG. 12 is a collection of diagrams that illustrate aberrations of the imaging lens of Example 5, wherein A illustrates spherical aberration, B illustrates astigmatism, C illustrates distortion, and D illustrates lateral chromatic aberration.
Figure 13:
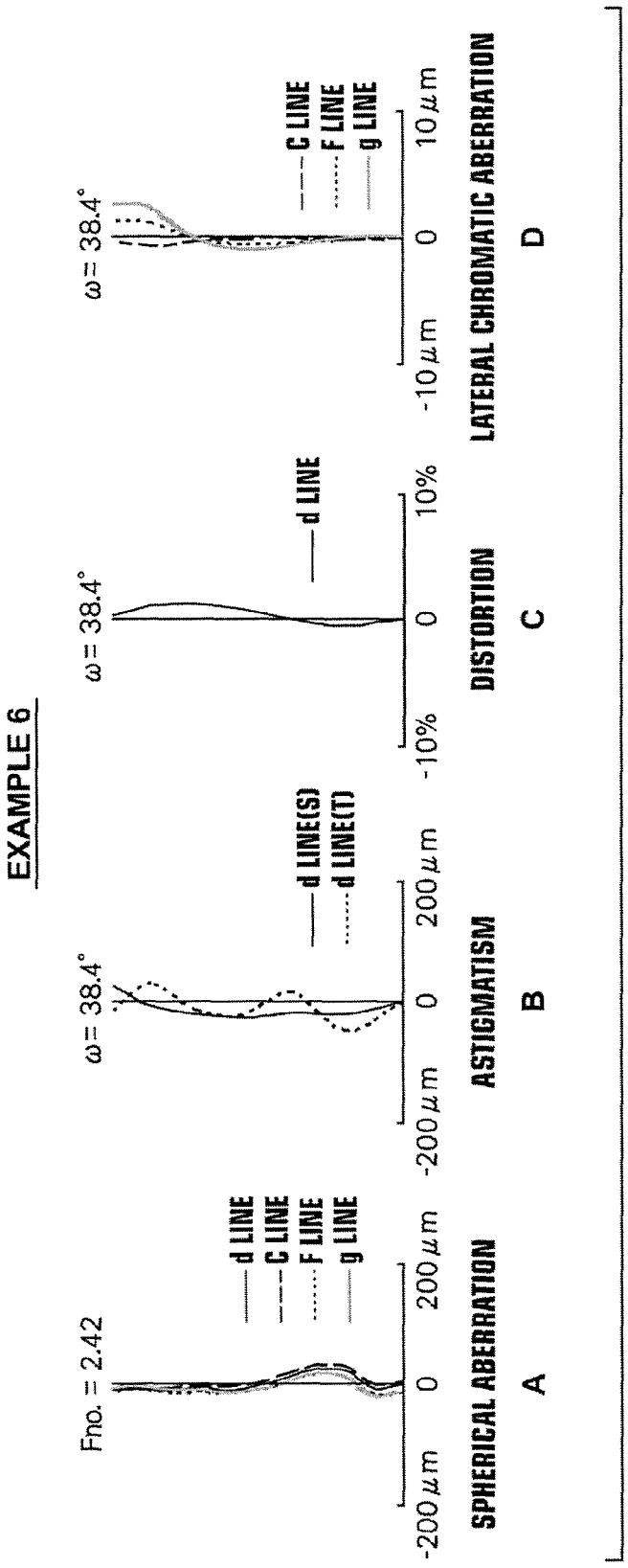
FIG. 13 is a collection of diagrams that illustrate aberrations of the imaging lens of Example 6, wherein A illustrates spherical aberration, B illustrates astigmatism, C illustrates distortion, and D illustrates lateral chromatic aberration.

Similarly, the aberrations of the imaging lens of Example 2 through Example 6 are illustrated in A through D of FIG. 9 through A through D of FIG. 13.

Table 13 shows values corresponding to Conditional Formulae (1) through (8), respectively summarized for each of Examples 1 through 6.

As can be understood from each set of numerical value data and from the diagrams that illustrate aberrations, each of the Examples realize a shortening of the total length of the lens and high imaging performance.

Note that the imaging lens of the present disclosure is not limited to the embodiments and Examples described above, and various modifications are possible. For example, the values of the radii of curvature, the distances among surfaces, the refractive indices, the Abbe's numbers, the aspherical surface coefficients, etc., are not limited to the numerical values indicated in connection with the Examples of numerical values, and may be other values.

In addition, the Examples are described under the presumption that they are to be utilized with fixed focus. However, it is also possible for configurations capable of adjusting focus to be adopted. It is possible to adopt a configuration, in which the entirety of the lens system is fed out or a portion of the lenses is moved along the optical axis to enable automatic focus, for example.

TABLE 1

Example 1
f = 3.826, Bf = 0.982

| Si | Ri | Di | ndj | νdj |
|---|---|---|---|---|
| *1 | 1.25015 | 0.540 | 1.54488 | 54.87 |
| *2 | 12.37884 | 0.040 | | |
| 3 (aperture stop) | ∞ | 0.047 | | |
| *4 | −5.35042 | 0.238 | 1.63351 | 23.63 |
| *5 | 6.37589 | 0.250 | | |
| *6 | 2.80285 | 0.244 | 1.63351 | 23.63 |
| *7 | 3.48530 | 0.524 | | |
| *8 | −5.82819 | 0.430 | 1.63351 | 23.63 |
| *9 | −11.06670 | 0.267 | | |
| *10 | 1.50354 | 0.560 | 1.54488 | 54.87 |
| *11 | 1.16563 | 0.523 | | |
| 12 | ∞ | 0.210 | 1.51633 | 64.14 |
| 13 | ∞ | 0.320 | | |
| 14 | ∞ | | | |

*aspherical surface

TABLE 3

Example 2
f = 4.140, Bf = 1.116

| Si | Ri | Di | ndj | νdj |
|---|---|---|---|---|
| *1 | 1.20953 | 0.557 | 1.54488 | 54.87 |
| *2 | 6.34736 | 0.035 | | |
| 3 (aperture stop) | ∞ | 0.066 | | |
| *4 | −12.41916 | 0.334 | 1.63351 | 23.63 |
| *5 | 3.59086 | 0.243 | | |
| *6 | 1.51945 | 0.253 | 1.54488 | 54.87 |
| *7 | 1.53247 | 0.506 | | |
| *8 | 22.97492 | 0.347 | 1.63351 | 23.63 |
| *9 | 11.07829 | 0.258 | | |
| *10 | 1.59864 | 0.455 | 1.54488 | 54.87 |
| *11 | 1.31294 | 0.500 | | |
| 12 | ∞ | 0.300 | 1.51633 | 64.14 |
| 13 | ∞ | 0.418 | | |
| 14 | ∞ | | | |

*aspherical surface

TABLE 2

Example 1: Aspherical Surface Data

| Surface Number | KA | A3 | A4 | A5 | A6 | A7 |
|---|---|---|---|---|---|---|
| 1 | −2.7067254E−01 | 0.0000000E+00 | −1.3856470E−01 | 1.4459894E+00 | −4.4628517E−01 | −2.1818314E+01 |
| 2 | −4.6546353E+00 | 0.0000000E+00 | −4.8670080E−01 | 4.2148197E+00 | −2.3275465E+01 | 6.4169190E+01 |
| 4 | −9.2836035E+00 | 0.0000000E+00 | −1.6036265E−01 | −1.1148518E+00 | 1.4720867E+01 | −6.8844959E+01 |
| 5 | 1.4762446E+01 | 0.0000000E+00 | 7.4642496E−02 | −1.8665538E+00 | 1.4729838E+01 | −6.0674094E+01 |
| 6 | −8.2731381E+00 | 0.0000000E+00 | −2.9397024E−01 | 6.0303548E−02 | 4.0864580E+00 | −3.1224318E+01 |
| 7 | 5.9409520E+00 | 0.0000000E+00 | −1.5162404E−01 | −7.4890354E−01 | 2.5099320E+00 | −5.6302792E+00 |
| 8 | −3.6554528E+00 | 0.0000000E+00 | 3.8665545E−01 | −1.4389533E+00 | 3.8562325E−01 | 7.1431979E+00 |
| 9 | −8.0514208E+00 | 0.0000000E+00 | −3.1494586E−01 | 3.3435427E−01 | 3.9373254E−01 | −1.0471293E+00 |
| 10 | −9.2186852E+00 | 0.0000000E+00 | −4.1172120E−01 | 3.0299961E−01 | −2.7619919E−01 | 8.4046391E−01 |
| 11 | −4.5325090E+00 | 0.0000000E+00 | −2.2964058E−01 | 9.3434411E−02 | 1.9776083E−02 | 2.3379667E−01 |

| | A8 | A9 | A10 | A11 | A12 | A13 |
|---|---|---|---|---|---|---|
| 1 | 6.9924452E+01 | −6.2560181E+01 | −3.3690677E+01 | 1.4416546E+01 | 1.1916143E+02 | 2.3021818E+01 |
| 2 | −1.0286015E+00 | −6.8927841E+02 | 2.7951791E+03 | −5.6985317E+03 | 5.8152266E+03 | −1.1735068E+03 |
| 4 | 1.8224107E+02 | −2.8413680E+02 | 3.4885254E+02 | −6.3682057E+02 | 1.0299817E+03 | −6.7268762E+02 |
| 5 | 1.3103081E+02 | −7.9249556E−01 | −1.6161688E+02 | 1.6720426E+02 | 1.8927263E+02 | −1.1401219E+02 |
| 6 | 8.3767674E+01 | −7.4947454E+01 | −3.9583551E+01 | 8.1727177E+01 | −3.7228021E+01 | 1.2397248E+02 |
| 7 | 1.1076208E+01 | −2.4276764E+01 | 3.6775775E+01 | 4.8402877E+00 | −1.1543739E+02 | 1.6908048E+02 |
| 8 | −1.6443194E+01 | 1.2930218E+01 | −1.4061220E+00 | 2.7441090E+00 | −1.0423205E+01 | 4.5590749E+00 |
| 9 | 4.2118602E−01 | 8.6836482E−01 | −1.1804070E+00 | 9.7713519E−02 | 9.2338572E−01 | −8.1716320E−01 |
| 10 | −1.0908329E+00 | 4.0021449E−01 | 2.7538720E−01 | −2.4261156E−01 | 1.1605063E−02 | 2.8306818E−02 |
| 11 | −4.5214928E−01 | 2.9624460E−01 | −6.1937260E−02 | −6.3858568E−03 | −3.4682530E−03 | 3.5857569E−03 |

| | A14 | A15 | A16 | A17 | A18 |
|---|---|---|---|---|---|
| 1 | −2.3205546E+02 | −3.9686418E+01 | 3.5484932E+02 | −2.2704846E+02 | 3.4341233E+01 |
| 2 | −2.2129906E+03 | −1.4134646E+03 | 5.9807332E+03 | −4.6154220E+03 | 1.1674148E+03 |
| 4 | −1.3743793E+02 | 6.8800202E+01 | 3.5610367E+02 | −1.5906037E+02 | −4.2275520E+01 |
| 5 | −1.5265313E+02 | −3.1977276E+02 | 4.7189533E+02 | 1.5863972E+02 | −2.4778657E+02 |
| 6 | 6.0685075E−01 | −5.9337064E+02 | 8.3606314E+02 | −4.0665424E+02 | 5.2172293E+01 |
| 7 | −7.0143466E+01 | −6.6585269E+01 | 1.0043515E+02 | −5.2497200E+01 | 1.0605210E+01 |
| 8 | 3.3381912E+00 | 2.3632569E+00 | −9.4694899E+00 | 6.8567052E+00 | −1.6563622E+00 |
| 9 | 2.0720115E−01 | 1.0406994E−01 | −9.3606657E−02 | 2.5908896E−02 | −2.2180453E−03 |
| 10 | −1.1893897E−03 | 3.2477552E−04 | −3.3492736E−03 | 1.4798822E−03 | −1.8895666E−04 |
| 11 | 5.3742219E−04 | −4.5239186E−04 | −1.4774379E−04 | 1.0271778E−04 | −1.4201246E−05 |

TABLE 4

Example 2: Aspherical Surface Data

| Surface Number | KA | A4 | A6 | A8 | A10 | A12 |
|---|---|---|---|---|---|---|
| 1 | 4.9659980E−01 | 2.7523193E−03 | 8.3810939E−02 | −3.1555637E−01 | 5.2597344E−01 | −6.1723080E−01 |
| 2 | 1.0000000E+00 | −1.0916170E−01 | 9.7155408E−02 | −1.6877490E−01 | −5.4165804E−03 | −8.8550197E−01 |
| 4 | 9.9999996E+00 | 3.8018349E−02 | 1.8719409E−01 | −3.7094490E−02 | −4.1299418E−01 | −8.2655890E−01 |
| 5 | 3.1182039E+00 | 7.4686573E−02 | 9.4484787E−01 | −3.8655127E+00 | 1.4807325E+01 | −3.5451241E+01 |
| 6 | 7.0000000E−01 | −2.5245366E−01 | 4.0275021E−01 | −8.4792305E−01 | 1.7966091E+00 | −2.8519073E+00 |
| 7 | 1.0000000E+00 | −1.9177048E−01 | 1.0816451E−01 | 5.6363101E−02 | −2.2196894E−01 | 1.4907902E−01 |
| 8 | 3.7000000E−01 | −7.2840681E−02 | −6.4988376E−02 | 3.1706121E−01 | −6.0114459E−01 | 4.5768624E−01 |
| 9 | 2.7999526E−01 | −3.1465090E−01 | 3.7165461E−01 | −2.5672764E−01 | 6.9520019E−02 | −2.3578346E−03 |
| 10 | −2.9053284E+00 | −6.2831023E−01 | 4.6192460E−01 | −1.5678321E−01 | 2.3561103E−02 | 1.8528115E−04 |
| 11 | −4.9895168E+00 | −3.2033794E−01 | 2.3376089E−01 | −1.2413305E−01 | 4.5585865E−02 | −1.0279032E−02 |

|  | A14 | A16 |
|---|---|---|
| 1 | 3.1068326E−01 | −1.8390534E−01 |
| 2 | 1.9158130E+00 | −1.0901241E+00 |
| 4 | 3.1122672E+00 | −2.0018729E+00 |
| 5 | 4.6271911E+01 | −2.3829567E+01 |
| 6 | 2.5499657E+00 | −9.2434443E−01 |
| 7 | −2.2808436E−03 | −1.8580023E−02 |
| 8 | −1.2424004E−01 | 2.9764653E−03 |
| 9 | 3.8205068E−03 | −2.0117135E−03 |
| 10 | −4.7352427E−04 | 3.9996048E−05 |
| 11 | 1.2413160E−03 | −5.9692520E−05 |

TABLE 5

Example 3
f = 3.864, Bf = 0.976

| Si | Ri | Di | ndj | vdj |
|---|---|---|---|---|
| *1 | 1.26288 | 0.548 | 1.54488 | 54.87 |
| *2 | 13.20388 | 0.020 | | |
| 3 (aperture stop) | ∞ | 0.059 | | |
| *4 | −5.47913 | 0.238 | 1.63351 | 23.63 |
| *5 | 6.54576 | 0.254 | | |
| *6 | 2.84194 | 0.254 | 1.63351 | 23.63 |
| *7 | 3.50056 | 0.529 | | |
| *8 | −5.83669 | 0.452 | 1.63351 | 23.63 |
| *9 | −11.14438 | 0.269 | | |
| *10 | 1.51590 | 0.556 | 1.54488 | 54.87 |
| *11 | 1.15185 | 0.523 | | |
| 12 | ∞ | 0.250 | 1.51633 | 64.14 |
| 13 | ∞ | 0.288 | | |
| 14 | ∞ | | | |

*aspherical surface

TABLE 6

Example 3: Aspherical Surface Data

| Surface Number | KA | A3 | A4 | A5 | A6 | A7 |
|---|---|---|---|---|---|---|
| 1 | −2.7021930E−01 | −8.0664666E−03 | 3.9029948E−02 | −6.0555770E−01 | 9.9017623E+00 | −4.3818227E+01 |
| 2 | 4.7299332E+00 | −2.0748427E−03 | −3.0193222E−01 | 1.4996560E+00 | −4.9629697E−01 | −2.8513402E+01 |
| 4 | −1.0959541E+01 | −5.2568148E−03 | −6.1124314E−03 | −2.3875783E+00 | 2.0924135E+01 | −7.8913381E+01 |
| 5 | 1.5305363E+01 | −2.1050737E−02 | 6.5137211E−01 | −9.3212881E+00 | 6.0312951E+01 | −1.9520808E+02 |
| 6 | −8.0795172E+00 | −1.0712694E−02 | −1.9901348E−01 | −3.1068543E−01 | −5.7133767E+00 | 7.5388490E+01 |
| 7 | 6.8668040E+00 | −1.9245571E−03 | −1.9759656E−01 | −8.5890189E−01 | 4.8013980E+00 | −1.3025802E+01 |
| 8 | −1.6537596E+01 | 8.1344303E−03 | 2.1755664E−01 | −1.7719184E−01 | −5.1481218E+00 | 2.0496788E+01 |
| 9 | −1.3152043E+01 | 2.2317963E−02 | −7.3095724E−01 | 2.6796142E+00 | −7.6188608E+00 | 1.5897503E+01 |
| 10 | −9.0759936E+00 | −9.3304439E−04 | −3.8857748E−01 | 2.6073899E−02 | 5.3393146E−01 | −3.9850954E−01 |
| 11 | −4.5317892E+00 | −1.0836589E−03 | −1.9905927E−01 | −9.9694356E−03 | 2.6433807E−01 | −1.8299641E−01 |

|  | A8 | A9 | A10 | A11 | A12 | A13 |
|---|---|---|---|---|---|---|
| 1 | 5.6047973E+01 | 1.2623525E+02 | −4.5048008E+02 | 2.5703326E+02 | 7.2294581E+02 | −1.3523010E+03 |
| 2 | 1.0796327E+02 | −1.2875333E+02 | −2.3198738E+01 | 9.3837460E+01 | −8.3015805E+01 | 7.8355706E+02 |
| 4 | 1.3072216E+02 | 3.4946046E+01 | −4.2741936E+02 | 3.7985605E+02 | 2.8326135E+02 | −1.8047306E+02 |
| 5 | 2.1365186E+02 | 5.6106344E+02 | −1.9269144E+03 | 6.4976020E+03 | 5.8588415E+03 | −1.2252424E+04 |
| 6 | −3.8441669E+02 | 9.6831284E+02 | −8.9291594E+02 | −1.4413697E+03 | 5.3286083E+03 | −6.9367262E+03 |
| 7 | 1.9701445E+01 | −2.0951240E+01 | 2.1503930E+01 | −9.6591160E+00 | −1.8288416E+01 | 1.9379455E+01 |
| 8 | −3.3014237E+01 | 2.0230119E+01 | 5.9219024E+00 | −1.4413792E+01 | 9.0908253E+00 | −6.9263953E+00 |
| 9 | −2.0040299E+01 | 1.0751588E+01 | 5.5934361E+00 | −1.2699723E+01 | 7.8527547E+00 | −1.5654722E+00 |
| 10 | −6.5714560E−02 | 1.2796644E−01 | 2.7290586E−02 | −3.4030956E−02 | −4.4227799E−03 | −3.6310351E−03 |
| 11 | −2.3302742E−02 | 6.1536874E−02 | −1.0054012E−02 | −5.5515526E−03 | −1.0271455E−03 | 1.8222560E−03 |

TABLE 6-continued

Example 3: Aspherical Surface Data

|   | A14 | A15 | A16 | A17 | A18 | A19 |
|---|---|---|---|---|---|---|
| 1 | 8.3599727E+02 | −1.1624008E+02 | −4.4907797E+01 | | | |
| 2 | −1.8628321E+03 | 1.6776135E+03 | −5.3839816E+02 | | | |
| 4 | −9.9504875E+02 | 1.3201389E+03 | −4.8662025E+02 | | | |
| 5 | 1.0937007E+04 | −4.5991147E+03 | 6.9992993E+02 | | | |
| 6 | 4.6035893E+03 | −1.4611546E+03 | 1.4625479E+02 | | | |
| 7 | 1.1421768E+01 | −2.0552851E+01 | 6.5902431E+00 | | | |
| 8 | 4.7173804E+00 | −9.3710285E−01 | −1.8574254E−01 | | | |
| 9 | −4.4086111E−01 | 2.4594967E−01 | −2.8675493E−02 | | | |
| 10 | 7.8404748E−03 | −1.1197463E−03 | −7.0975910E−04 | −7.1133388E−05 | 1.5294760E−04 | −2.59733E−05 |
| 11 | −5.0066402E−04 | 4.0414578E−04 | −2.5932683E−04 | 3.0435411E−05 | 1.7760600E−05 | −4.0818E−06 |

TABLE 7

Example 4
f = 3.867, Bf = 1.061

| Si | Ri | Di | ndj | vdj |
|---|---|---|---|---|
| 1 (aperture stop) | ∞ | −0.145 | | |
| *2 | 1.26370 | 0.560 | 1.54488 | 54.87 |
| *3 | 19.78764 | 0.106 | | |
| *4 | −4.56732 | 0.212 | 1.63351 | 23.63 |
| *5 | 6.40626 | 0.243 | | |
| *6 | 3.05787 | 0.243 | 1.63351 | 23.63 |
| *7 | 3.70930 | 0.546 | | |
| *8 | −5.48697 | 0.436 | 1.63351 | 23.63 |

TABLE 7-continued

Example 4
f = 3.867, Bf = 1.061

| Si | Ri | Di | ndj | vdj |
|---|---|---|---|---|
| *9 | −5.97443 | 0.230 | | |
| *10 | 1.47934 | 0.506 | 1.54488 | 54.87 |
| *11 | 1.09638 | 0.523 | | |
| 12 | ∞ | 0.257 | 1.51633 | 64.14 |
| 13 | ∞ | 0.369 | | |
| 14 | ∞ | | | |

*aspherical surface

TABLE 8

Exampe 4: Aspherical Surface Data

| Surface Number | KA | A3 | A4 | A5 | A6 | A7 |
|---|---|---|---|---|---|---|
| 2 | −2.7125650E−01 | 0.0000000E+00 | −6.5712405E−02 | 4.1147953E−01 | 2.6953910E+00 | −2.0905795E+01 |
| 3 | −1.1124926E+01 | 0.0000000E+00 | −1.0776609E−01 | 3.4056050E−01 | −2.4923598E−01 | −2.0455817E+00 |
| 4 | 1.9815435E+00 | 0.0000000E+00 | −1.0619626E−02 | 2.4370486E+00 | −2.7061100E+01 | 1.6449557E+02 |
| 5 | 2.8087181E+00 | 0.0000000E+00 | −2.3724511E−01 | −2.6438473E−01 | 2.3206210E+01 | −1.4245677E+02 |
| 6 | −1.1198396E+00 | 0.0000000E+00 | −4.4275814E−01 | −2.7899891E−01 | 1.1177943E+00 | −6.5416319E+01 |
| 7 | 4.1019758E+00 | 0.0000000E+00 | −1.9934769E−01 | −5.9245686E−01 | 2.6903253E+00 | −6.5415288E+00 |
| 8 | 1.4933468E+01 | 0.0000000E+00 | 2.3083855E−01 | −6.9625100E−01 | 3.5247940E−01 | 1.6912672E+00 |
| 9 | 1.1900890E+00 | 0.0000000E+00 | −2.3735195E−01 | −1.9407196E−01 | 2.1968802E+00 | −4.4696302E+00 |
| 10 | −9.1043989E+00 | 0.0000000E+00 | −3.9809011E−01 | 1.5741518E−01 | 9.5842313E−03 | 5.0941456E−01 |
| 11 | −4.5679703E+00 | 0.0000000E+00 | −1.9603167E−01 | 1.3560706E−02 | 1.3047592E−01 | −2.4151296E−02 |

| | A8 | A9 | A10 | A11 | A12 | A13 |
|---|---|---|---|---|---|---|
| 2 | 5.1537790E+01 | −2.3598725E+01 | −1.3705806E+02 | 2.8139442E+02 | −1.4045010E+02 | −1.6797533E+02 |
| 3 | 9.7376005E−01 | 1.9497846E+00 | −2.9913829E+01 | −5.4651617E+01 | 1.8912323E+02 | −1.6982276E+02 |
| 4 | −5.8643978E+02 | 1.2587488E+03 | −1.4798700E+03 | 4.8918174E+02 | 8.2120979E+02 | −6.0471511E+02 |
| 5 | 4.1843693E+02 | −6.9514144E+02 | 7.7486120E+02 | −7.7145927E+02 | 2.9497002E+02 | 1.5578790E+03 |
| 6 | 1.5958207E+02 | −9.9703493E+01 | −2.7014899E+02 | 4.3549792E+02 | 1.5315080E+02 | −6.3994044E+02 |
| 7 | 1.1271244E+01 | −2.0898036E+01 | 4.1733881E+01 | −5.8217212E+01 | 5.2087404E+01 | −4.2026219E+01 |
| 8 | −1.9257441E+00 | −4.5879761E+00 | 1.0660407E+01 | −7.3227314E+00 | 1.6084230E+00 | −1.3468514E+00 |
| 9 | 5.8439380E+00 | −6.5103432E+00 | 4.9331593E+00 | −1.1297047E+00 | −1.1331358E+00 | 5.1122443E−01 |
| 10 | −7.7274809E−01 | 3.5146805E−01 | 3.1138661E−02 | −5.9511656E−02 | 8.4750621E−04 | 8.4460498E−03 |
| 11 | −4.6107806E−02 | −7.8002277E−03 | 2.8152663E−02 | 2.2140018E−04 | −1.2011970E−02 | 5.6576840E−03 |

| | A14 | A15 | A16 |
|---|---|---|---|
| 2 | 2.5343709E+02 | −1.1403486E+02 | 1.4498081E+01 |
| 3 | −6.7292288E+00 | 9.4008559E+01 | −4.0646974E+01 |
| 4 | −6.96655601E+02 | 1.0106888E+03 | −3.5252364E+02 |
| 5 | −3.4667828E+03 | 2.8928667E+03 | −8.8761579E+02 |
| 6 | 1.4801928E+02 | 3.7140658E+02 | −2.0415200E+02 |
| 7 | 4.0144479E+01 | −2.6761207E+01 | 7.1727213E+00 |
| 8 | 1.9996304E+00 | −7.7296425E−01 | 3.3049621E−02 |
| 9 | 4.1560851E−01 | −3.4948503E−01 | 7.1156860E−02 |
| 10 | −1.9321305E−03 | 8.5408342E−06 | 2.1094992E−05 |
| 11 | −8.7998122E−04 | −7.8181874E−06 | 9.5879084E−06 |

TABLE 9

Example 5
f = 3.880, Bf = 1.008

| Si | Ri | Di | ndj | vdj |
|---|---|---|---|---|
| 1 (aperture stop) | ∞ | −0.145 | | |
| *2 | 1.26282 | 0.540 | 1.54488 | 54.87 |
| *3 | 12.50093 | 0.087 | | |
| *4 | −5.40389 | 0.238 | 1.63351 | 23.63 |
| *5 | 6.43880 | 0.252 | | |
| *6 | 2.83132 | 0.246 | 1.63351 | 23.63 |
| *7 | 3.52017 | 0.529 | | |
| *8 | −5.88598 | 0.435 | 1.63351 | 23.63 |
| *9 | −11.18131 | 0.270 | | |
| *10 | 1.51890 | 0.565 | 1.54488 | 54.87 |
| *11 | 1.17723 | 0.523 | | |
| 12 | ∞ | 0.210 | 1.51633 | 64.14 |
| 13 | ∞ | 0.347 | | |
| 14 | ∞ | | | |

*aspherical surface

TABLE 11

Example 6
f = 3.882, Bf = 1.006

| Si | Ri | Di | ndj | vdj |
|---|---|---|---|---|
| *1 | 1.27528 | 0.540 | 1.54488 | 54.87 |
| *2 | 17.52644 | 0.020 | | |
| 3 (aperture stop) | ∞ | 0.067 | | |
| *4 | −5.23056 | 0.241 | 1.63351 | 23.63 |
| *5 | 6.18832 | 0.254 | | |
| *6 | 2.89865 | 0.241 | 1.63351 | 23.63 |
| *7 | 3.61999 | 0.545 | | |
| *8 | −5.84879 | 0.419 | 1.63351 | 23.63 |
| *9 | −11.58530 | 0.268 | | |
| *10 | 1.53794 | 0.576 | 1.54488 | 54.87 |
| *11 | 1.20494 | 0.528 | | |
| 12 | ∞ | 0.210 | 1.51633 | 64.14 |
| 13 | ∞ | 0.339 | | |
| 14 | ∞ | | | |

*aspherical surface

TABLE 10

Example 5: Aspherical Surface Data

| Surface Number | KA | A3 | A4 | A5 | A6 | A7 |
|---|---|---|---|---|---|---|
| 2 | −2.7055718E−01 | −4.4601951E−02 | 1.1376417E+00 | −1.4178722E+01 | 1.0188787E+02 | −4.2449941E+02 |
| 3 | −4.1647829E+00 | 4.9244394E−04 | −3.9974497E−01 | 2.3937403E+00 | −6.3453941E+00 | −1.9495953E−01 |
| 4 | −9.2941894E+00 | −7.4659272E−03 | 6.7687924E−02 | −3.0601090E+00 | 2.5790525E+01 | −9.7282591E+01 |
| 5 | 1.4770566E+01 | 1.6943044E−03 | 5.8387284E−04 | −6.1103390E−01 | 3.2981703E+00 | 4.5452862E+00 |
| 6 | −8.2735613E+00 | −1.2687661E−02 | 6.5600029E−02 | −3.9935460E+00 | 2.7662832E+01 | −1.0746427E+02 |
| 7 | 5.9415628E+00 | −2.9122381E−04 | −1.4587328E−01 | −6.8956715E−01 | 1.8147150E+00 | −1.4924053E+00 |
| 8 | −3.7044019E+00 | −5.6936529E−03 | 5.0800318E−01 | −2.5517961E+00 | 6.0966958E+00 | −1.0636619E+01 |
| 9 | −7.9648675E+00 | −4.4392349E−04 | −2.9501452E−01 | 2.7379255E−01 | 4.8296326E−01 | −1.2425633E+00 |
| 10 | −9.2180006E+00 | −4.1646185E−03 | −3.2971178E−01 | −8.5856800E−02 | 7.2894575E−01 | −6.0605658E−01 |
| 11 | −4.5332477E+00 | −7.7945874E−04 | −2.1034865E−01 | 1.5544808E−02 | 2.2941316E−01 | −1.2638604E−01 |

| | A8 | A9 | A10 | A11 | A12 | A13 |
|---|---|---|---|---|---|---|
| 2 | 1.0451278E+03 | −1.4225101E+03 | 7.2578015E+02 | 4.5866078E+02 | −2.6442939E+02 | −1.2165400E+03 |
| 3 | 2.7128830E+01 | −6.2235174E+00 | −6.7499972E+01 | −1.4589700E+02 | 5.7823790E+02 | −1.3291897E+02 |
| 4 | 1.7764800E+02 | −5.9259471E+01 | −2.8864016E+02 | 2.6289938E+02 | 2.6941193E+02 | 2.5211392E+01 |
| 5 | −9.5025769E+01 | 3.5752439E+02 | −4.3566512E+02 | −4.9986163E+02 | 1.7099641E+03 | −5.3397842E+02 |
| 6 | 2.0814027E+02 | −9.0382098E+01 | −3.4607178E+02 | 5.2666223E+02 | −5.9610228E+01 | −2.0918643E+02 |
| 7 | −3.6336472E+00 | 8.1074652E+00 | 6.4400287E−01 | −1.0094831E+01 | 7.1351575E−01 | 3.9420735E+00 |
| 8 | 1.7045511E+01 | −2.3044653E+01 | 1.7048333E+01 | −3.3856023E−01 | −5.4118191E+00 | −2.3332002E+00 |
| 9 | 9.6565405E−01 | −1.3907409E+00 | −1.2330731E−01 | −2.2127214E−01 | 3.0145203E−01 | −1.7572372E−02 |
| 10 | −4.4324046E−02 | 2.8772802E−01 | −1.1429331E−01 | 1.6639582E−02 | −1.9597321E−02 | 5.6579490E−03 |
| 11 | −7.7875548E−02 | 7.7772829E−02 | −6.1079151E−03 | −4.3351904E−03 | −3.5192692E−03 | 1.1379277E−03 |

| | A14 | A15 | A16 | A17 | A18 | A19 |
|---|---|---|---|---|---|---|
| 2 | 1.7734352E+03 | −9.4447084E+02 | 1.8055449E+02 | | | |
| 3 | −1.1314946E+03 | 1.3681651E+03 | −4.8599375E+02 | | | |
| 4 | −1.3126488E+03 | 1.5550037E+03 | −5.5625796E+02 | | | |
| 5 | −2.4302097E+03 | 2.9692189E+03 | −1.0519779E+03 | | | |
| 6 | −2.2760035E+02 | 4.6990557E+02 | −1.8876147E+02 | | | |
| 7 | 9.9675544E+00 | −1.3282818E+01 | 4.0021657E+00 | | | |
| 8 | 3.5833518E+00 | 1.5736495E+00 | −2.0991156E−01 | −3.9407997E+00 | 3.3492485E+00 | −0.85702982 |
| 9 | −9.9288339E−02 | 4.4756729E−02 | −2.8260394E−02 | 2.6006812E−02 | −1.1739943E−02 | 0.001966195 |
| 10 | 5.5944102E−03 | −2.7106581E−03 | 5.2569259E−04 | −4.4515753E−04 | 2.1599410E−04 | −3.12012E−05 |
| 11 | 6.2045782E−04 | −9.7454970E−05 | −3.6484632E−05 | −4.1657800E−05 | 2.5169430E−05 | −3.53958E−06 |

TABLE 12

Example 6: Aspherical Surface Data

| Surface Number | KA | A3 | A4 | A5 | A6 | A7 |
|---|---|---|---|---|---|---|
| 1 | −2.6566761E−01 | 5.2928584E−03 | −3.3371606E−01 | 3.5893523E+00 | −1.6386436E+01 | 5.2042609E+01 |
| 2 | 1.3014267E+01 | 2.9996957E−04 | −4.3184480E−01 | 4.1491127E+00 | −1.6779846E+01 | −6.9187365E+00 |
| 4 | −3.4126539E+00 | 3.3237119E−03 | −1.9231106E−01 | 1.1077077E+00 | −2.4798328E+00 | 1.2307620E+01 |
| 5 | 1.2109543E+01 | −1.3982881E−03 | 5.4770443E−02 | −7.0125347E−01 | 1.3621662E+00 | 2.8697444E+01 |
| 6 | −8.7144481E+00 | −1.2931758E−02 | 6.4043141E−02 | −4.7485709E+00 | 3.6356814E+01 | −1.5019428E+02 |
| 7 | 5.5907113E+00 | −1.2075402E−03 | −1.7054951E−01 | −7.3059192E−01 | 2.9551266E+00 | −4.5579361E+00 |
| 8 | 1.5218008E+01 | 2.6357770E−01 | −4.3393102E+00 | 3.1856702E+01 | −1.1905975E+02 | 2.3320709E+02 |
| 9 | 1.5087769E+01 | 8.4030778E−04 | −3.6266662E−01 | 3.7164328E−01 | 4.1383409E−01 | −9.1172249E−01 |
| 10 | −1.0143100E+01 | −5.6092813E−03 | −3.0429758E−01 | −1.0353140E−01 | 6.7032388E−01 | −3.7271910E−01 |
| 11 | −4.9526045E+00 | 8.0300657E−04 | −1.9413340E−01 | 6.6352658E−02 | 8.7668614E−01 | −2.4218980E−02 |

| | A8 | A9 | A10 | A11 | A12 | A13 |
|---|---|---|---|---|---|---|
| 1 | −1.3576637E+02 | 2.6162685E+02 | −2.3328347E+02 | −2.0292305E+02 | 6.4878389E+02 | −2.9874068E+02 |
| 2 | 3.7390129E+02 | −1.8225134E+03 | 4.6465835E+03 | −6.5087558E+03 | 3.0636326E+03 | 5.1387910E+03 |
| 4 | −7.8088310E+01 | 2.6212804E+02 | −3.9745136E+02 | 1.7610824E+02 | −1.6265093E+02 | 1.4120754E+03 |
| 5 | −2.2141462E+02 | 7.2113093E+02 | −1.0756180E+03 | 2.5241780E+02 | 1.0690867E+03 | −1.9044238E+02 |
| 6 | 3.3013431E+02 | −2.8444528E+02 | −2.8413345E+02 | 9.3105400E+02 | −8.9877491E+02 | 4.7324480E+02 |
| 7 | −1.9269084E+00 | 1.6327067E+01 | −2.5758964E+01 | 3.0707011E+01 | −3.2716768E+01 | 1.2185509E+01 |
| 8 | −2.1365593E+02 | 7.1371164E+01 | −2.0014948E+02 | 6.3711011E+02 | −7.2127615E+02 | 4.1418491E+02 |
| 9 | 4.4883558E−01 | −2.4557562E−01 | 4.5482745E−01 | −3.4773094E−01 | −5.6145707E−02 | 9.4111029E−02 |
| 10 | −4.6796740E−01 | 7.1134577E−01 | −3.2300603E−01 | 1.6780416E−02 | 3.5494158E−02 | −1.4955387E−02 |
| 11 | −8.1032367E−02 | 4.3418689E−02 | 2.8178473E−02 | −3.0861787E−02 | 7.4102151E−03 | 8.6209064E−04 |

| | A14 | A15 | A16 | A17 | A18 | A19 |
|---|---|---|---|---|---|---|
| 1 | −4.8703897E+02 | 6.0738972E+02 | −1.9910645E+02 | | | |
| 2 | −9.9352025E+03 | 6.8404387E+03 | −1.7782544E+03 | | | |
| 4 | −2.8410957E+03 | 2.3125789E+03 | −6.9517849E+02 | | | |
| 5 | −2.3864484E+03 | 2.7535589E+03 | −9.5381254E+02 | | | |
| 6 | −3.5450938E+02 | 3.2623456E+02 | −1.2076154E+02 | | | |
| 7 | 1.7746431E+01 | −1.9563625E+01 | 5.3681402E+00 | | | |
| 8 | −5.2513497E+02 | 9.8703633E+02 | −9.6138398E+02 | 4.6540754E+02 | −1.0154652E+02 | 6.0007748 |
| 9 | 8.0538571E−03 | −4.9425494E−02 | 4.4128382E−02 | −2.5113660E−02 | 7.3308275E−03 | −0.000703515 |
| 10 | 5.3641983E−04 | 3.1022216E−03 | −1.0620467E−03 | −3.1244662E−04 | 2.2126980E−04 | −3.13009E−05 |
| 11 | −4.0276287E−04 | −6.5434460E−05 | 1.0638051E−04 | −8.5803586E−05 | 3.1488458E−05 | −4.0515E−06 |

TABLE 13

| Formula | Condition | Example 1 | Example 2 | Example 3 | Example 4 | Example 5 | Example 6 |
|---|---|---|---|---|---|---|---|
| (1) | f1/f23 | −0.43 | −0.57 | −0.42 | −0.49 | −0.43 | −0.44 |
| (2) | f/f2 | −0.84 | −0.95 | −0.83 | −0.93 | −0.84 | −0.87 |
| (3) | (R3f−R3r)/(R3f + R3r) | −0.11 | −0.004 | −0.10 | −0.10 | −0.11 | −0.11 |
| (4) | Pair67 | −0.30 | −0.32 | −0.30 | −0.30 | −0.30 | −0.29 |
| (5) | f · tanω/R5r | 2.61 | 2.21 | 2.68 | 2.81 | 2.57 | 2.55 |
| (6) | f/f45 | −0.40 | −0.27 | −0.44 | −0.30 | −0.40 | −0.39 |
| (7) | Nd3 | 1.63351 | 1.54488 | 1.63351 | 1.63351 | 1.63351 | 1.63351 |
| (8) | νd3 | 23.63 | 54.87 | 23.63 | 23.63 | 23.63 | 23.63 |

What is claimed is:

1. An imaging lens consisting of five lenses, including, in order from the object side to the image side:

a first lens having a positive refractive power, which is of a meniscus shape having a convex surface toward the object side;

a second lens having a negative refractive power and a concave surface toward the image side;

a third lens having a positive refractive power, which is of a meniscus shape having a convex surface toward the object side;

a fourth lens having a negative refractive power; and a fifth lens having a negative refractive power and at least one inflection point on the surface thereof toward the image side;

in which the conditional formulae below are satisfied:

$$-3 < f1/f23 < -0.38 \quad (1)$$

$$-1 < f/f2 < -0.82 \quad (2\text{-}2)$$

$$-0.18 < (R3f-R3r)/(R3f+R3r) < 0.5 \quad (3)$$

wherein f1 is the focal length of the first lens, f23 is the combined focal length of the second lens and the third lens, f is the focal length of the entire lens system, f2 is the focal length of the second lens, R3f is the paraxial radius of curvature of the surface of the third lens toward the object side, and R3r is the paraxial radius of curvature of the surface of the third lens toward the image side.

2. An imaging lens consisting of five lenses, including, in order from the object side to the image side:

a first lens having a positive refractive power, which is of a meniscus shape having a convex surface toward the object side;

a second lens of a biconcave shape;

a third lens having a positive refractive power, which is of a meniscus shape having a convex surface toward the object side;

a fourth lens having a negative refractive power; and a fifth lens having a negative refractive power and at least one inflection point on the surface thereof toward the image side;

in which the conditional formulae below are satisfied:

$$-3<f1/f23<-0.38 \quad (1)$$

$$-1<f/f2<-0.82 \quad (2\text{-}2)$$

wherein f1 is the focal length of the first lens, f23 is the combined focal length of the second lens and the third lens, f is the focal length of the entire lens system, and f2 is the focal length of the second lens.

3. An imaging lens as defined in claim 2, in which the conditional formula below is further satisfied:

$$-0.18<(R3f-R3r)/(R3f+R3r)<0.5 \quad (3)$$

wherein R3f is the paraxial radius of curvature of the surface of the third lens toward the object side, and R3r is the paraxial radius of curvature of the surface of the third lens toward the image side.

4. An imaging lens as defined in claim 1, in which the conditional formula below is further satisfied:

$$-0.45<\text{Pair67}<-0.1 \quad (4)$$

wherein Pair67 is the refractive power of an air lens formed between the third lens and the fourth lens (1/focal length).

5. An imaging lens as defined in claim 1, in which the conditional formula below is further satisfied:

$$0.5<f\cdot\tan \omega/R5r<10 \quad (5)$$

wherein f is the focal length of the entire lens system, ω is the half angle of view, and R5r is the paraxial radius of curvature of the surface of the fifth lens toward the image side.

6. An imaging lens as defined in claim 1, wherein: the second lens is of a biconvex shape.

7. An imaging lens as defined in claim 1, further comprising:

an aperture stop positioned at the object side of the surface of the second lens toward the object side.

8. An imaging lens as defined in claim 1, in which the conditional formula below is further satisfied:

$$-0.46<f/f45<0 \quad (6)$$

wherein f is the focal length of the entire lens system, and f45 is the combined focal length of the fourth lens and the fifth lens.

9. An imaging lens as defined in claim 1, in which the conditional formula below is further satisfied:

$$1.6<Nd3 \quad (7)$$

wherein Nd3 is the refractive index of the material of the third lens with respect to the d line.

10. An imaging lens as defined in claim 1, in which the conditional formula below is further satisfied:

$$vd3<30 \quad (8)$$

wherein νd3 is the Abbe's number of the material of the third lens with respect to the d line.

11. An imaging lens as defined in claim 1, in which the conditional formula below is further satisfied:

$$-2<f1/f23<-0.4 \quad (1\text{-}1)$$

wherein f1 is the focal length of the first lens, and f23 is the combined focal length of the second lens and the third lens.

12. An imaging lens as defined in claim 1, in which the conditional formula below is further satisfied:

$$-0.15<(R3f-R3r)/(R3f+R3r)<0.2 \quad (3\text{-}1)$$

wherein R3f is the paraxial radius of curvature of the surface of the third lens toward the object side, and R3r is the paraxial radius of curvature of the surface of the third lens toward the image side.

13. An imaging lens as defined in claim 1, in which the conditional formula below is further satisfied:

$$-0.4<\text{Pair67}<-0.2 \quad (4\text{-}1)$$

wherein Pair67 is the refractive power of an air lens formed between the third lens and the fourth lens (1/focal length).

14. An imaging lens as defined in claim 1, in which the conditional formula below is further satisfied:

$$0.7<f\cdot\tan \omega/R5r<3 \quad (5\text{-}1)$$

wherein f is the focal length of the entire lens system, ω is the half angle of view, and R5r is the paraxial radius of curvature of the surface of the fifth lens toward the image side.

15. An imaging lens as defined in claim 1, further comprising:

an aperture stop positioned at the object side of the surface of the first lens toward the object side.

16. An imaging apparatus comprising the imaging lens as defined in claim 1.

* * * * *